May 5, 1970 F. J. SASS 3,509,681
CARTONING MACHINE AND METHOD
Filed Aug. 25, 1966 21 Sheets-Sheet 9
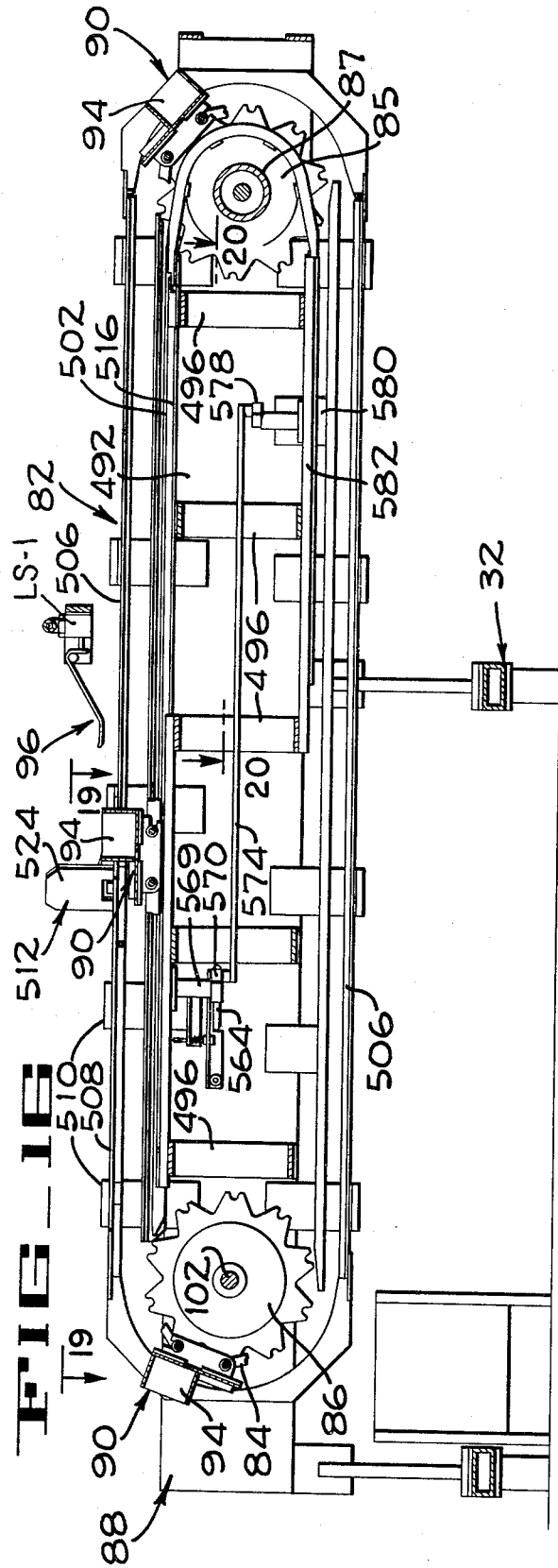
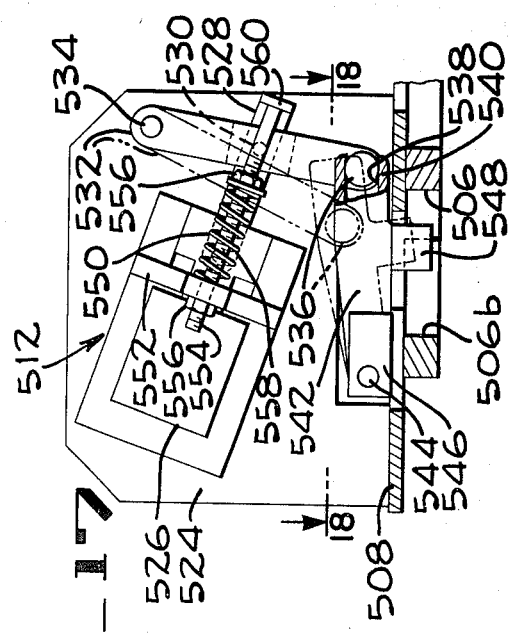
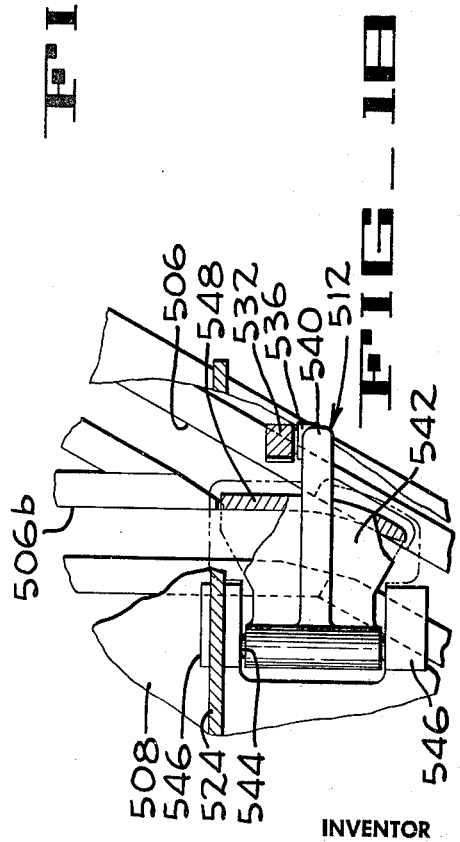
INVENTOR
FRANK J. SASS
BY Francis W. Anderson
ATTORNEY

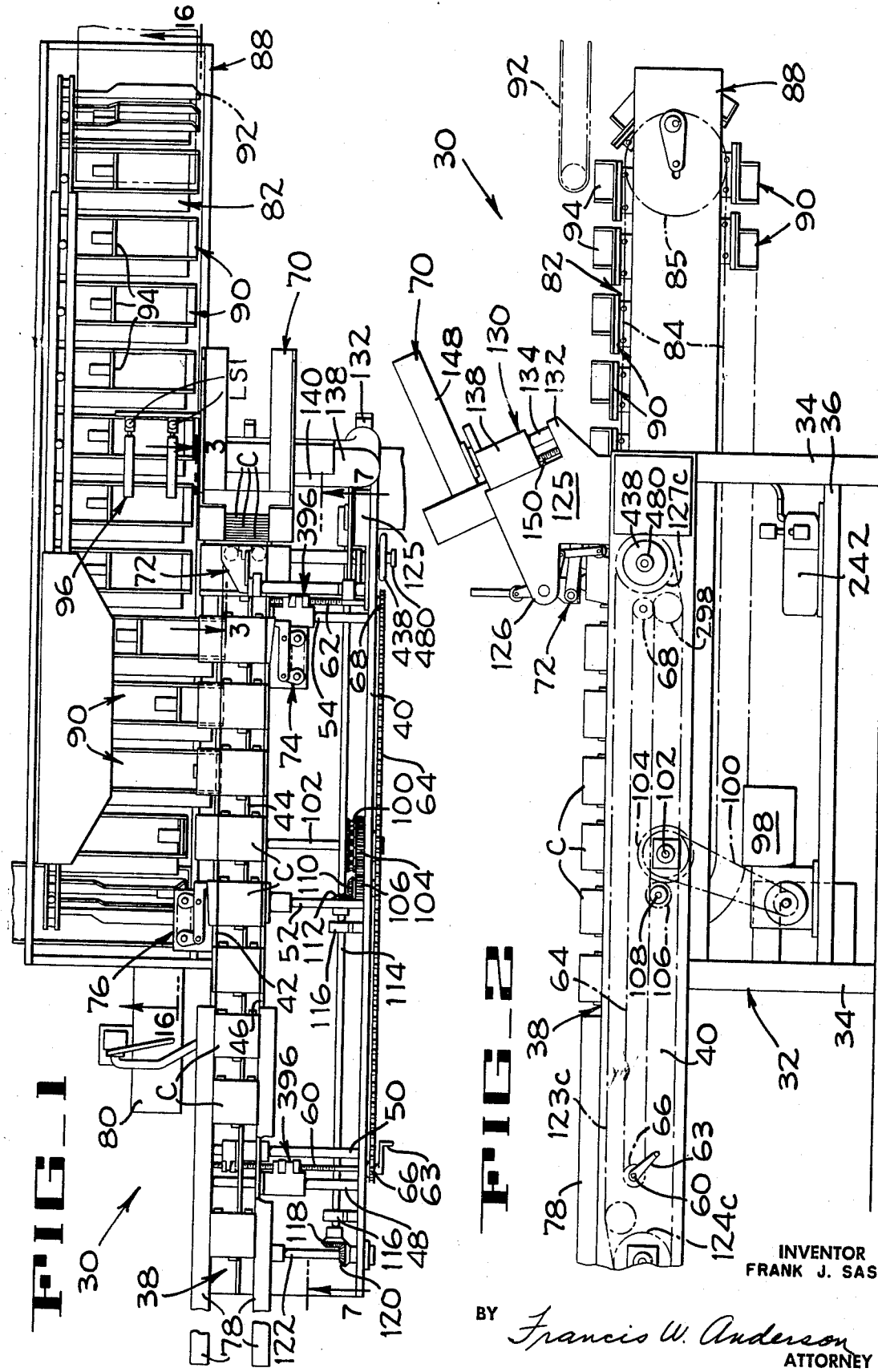

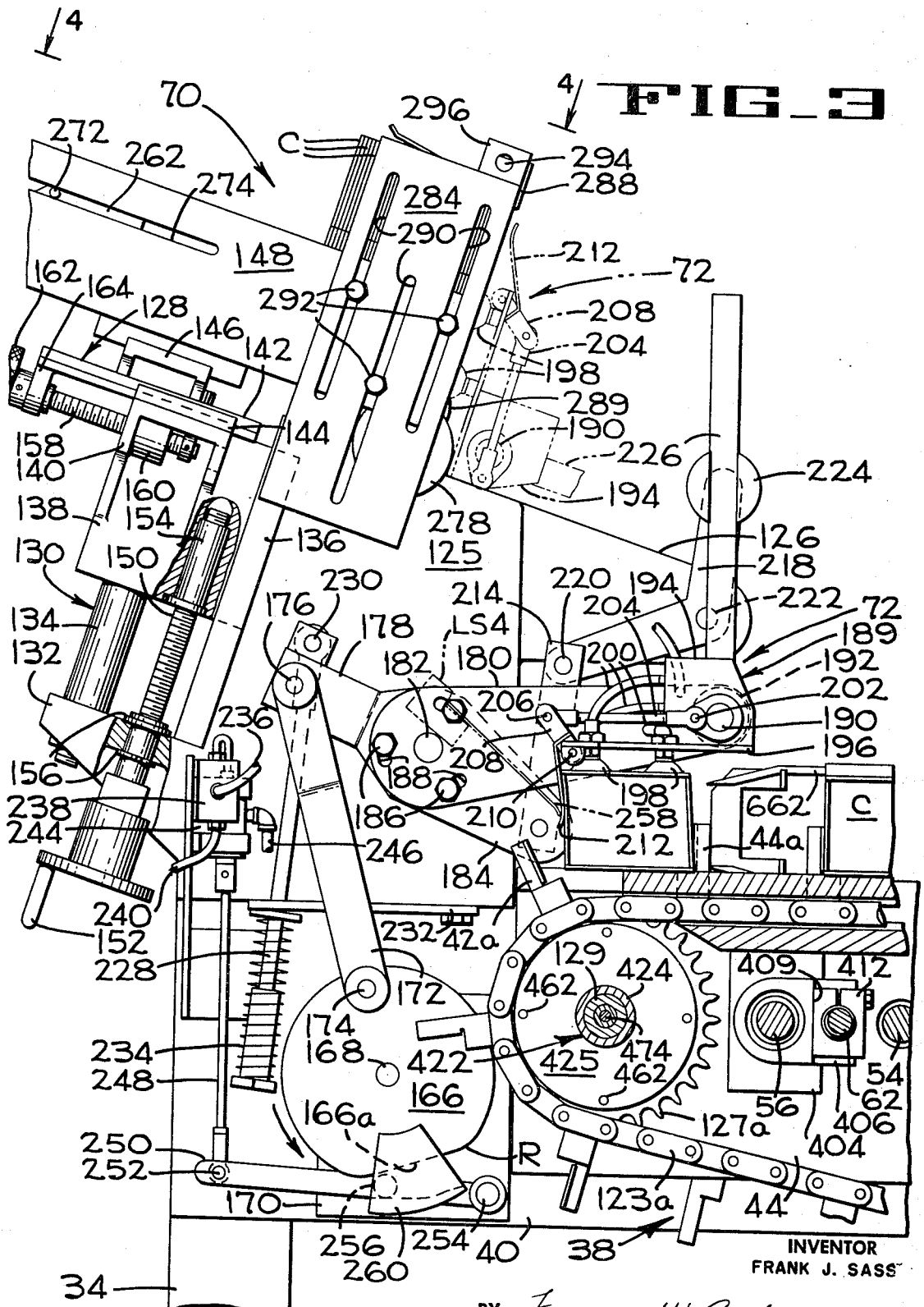

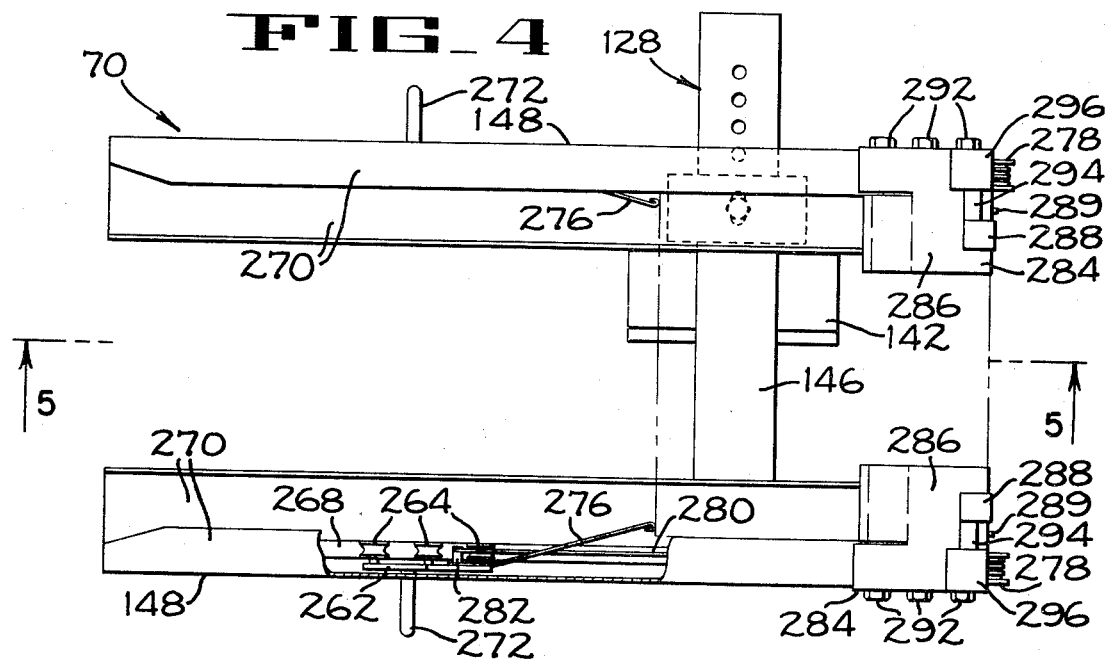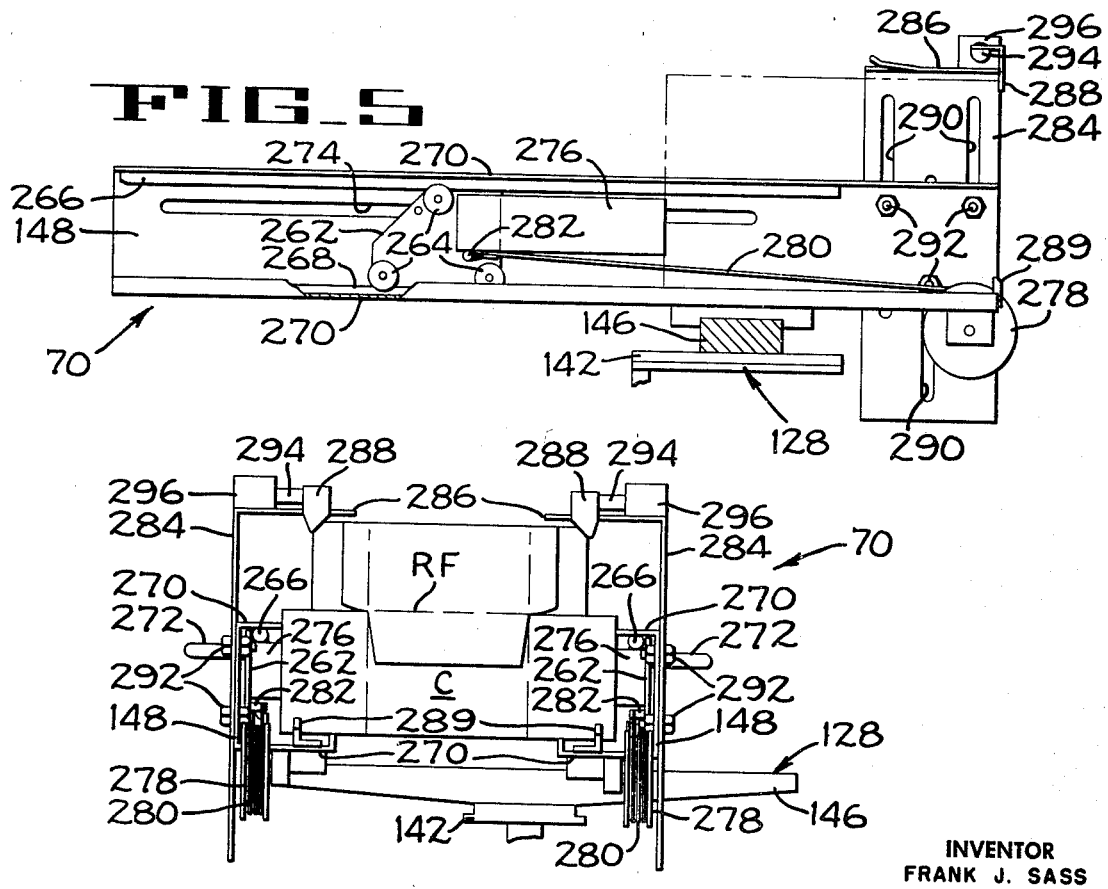

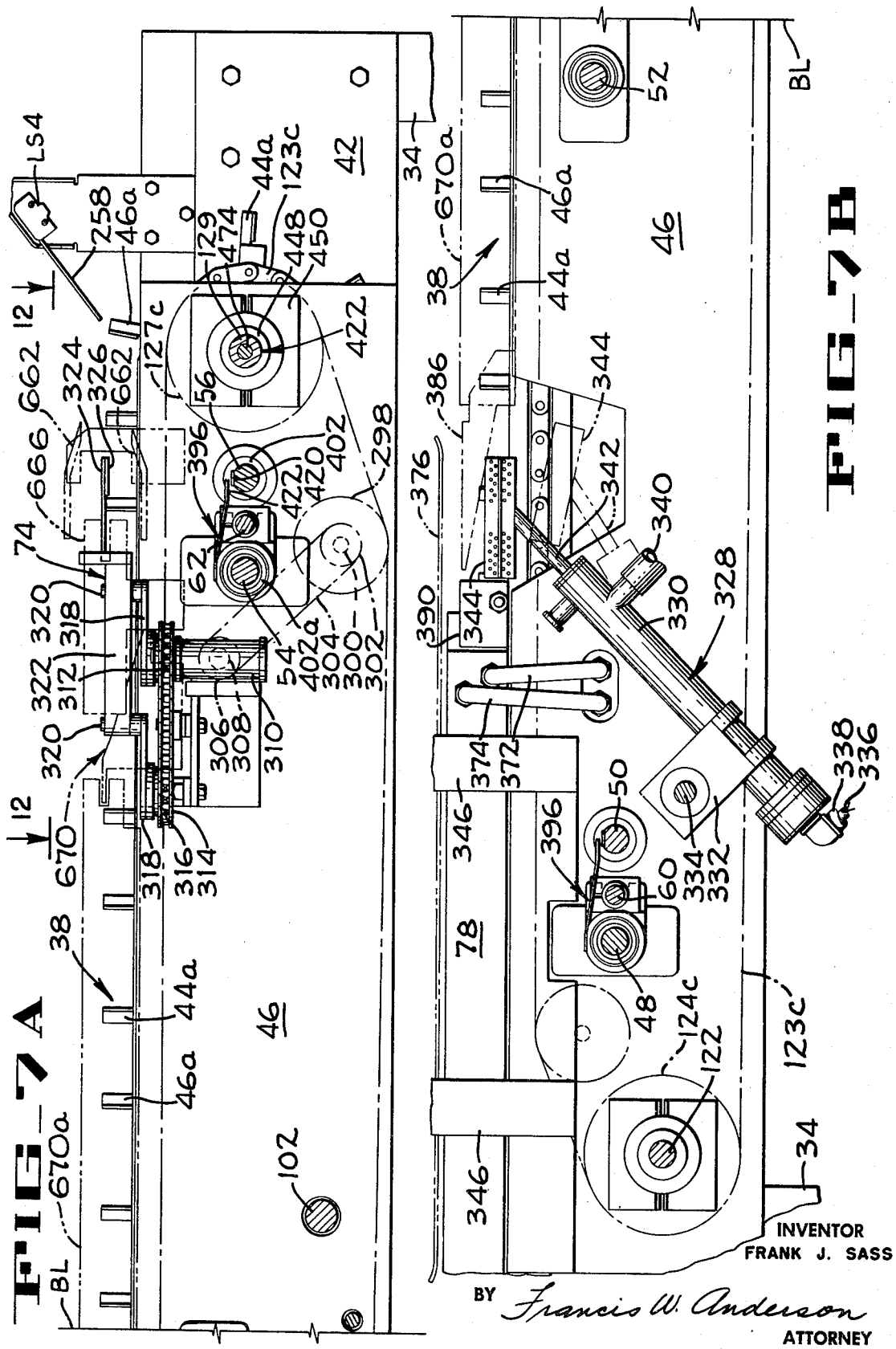

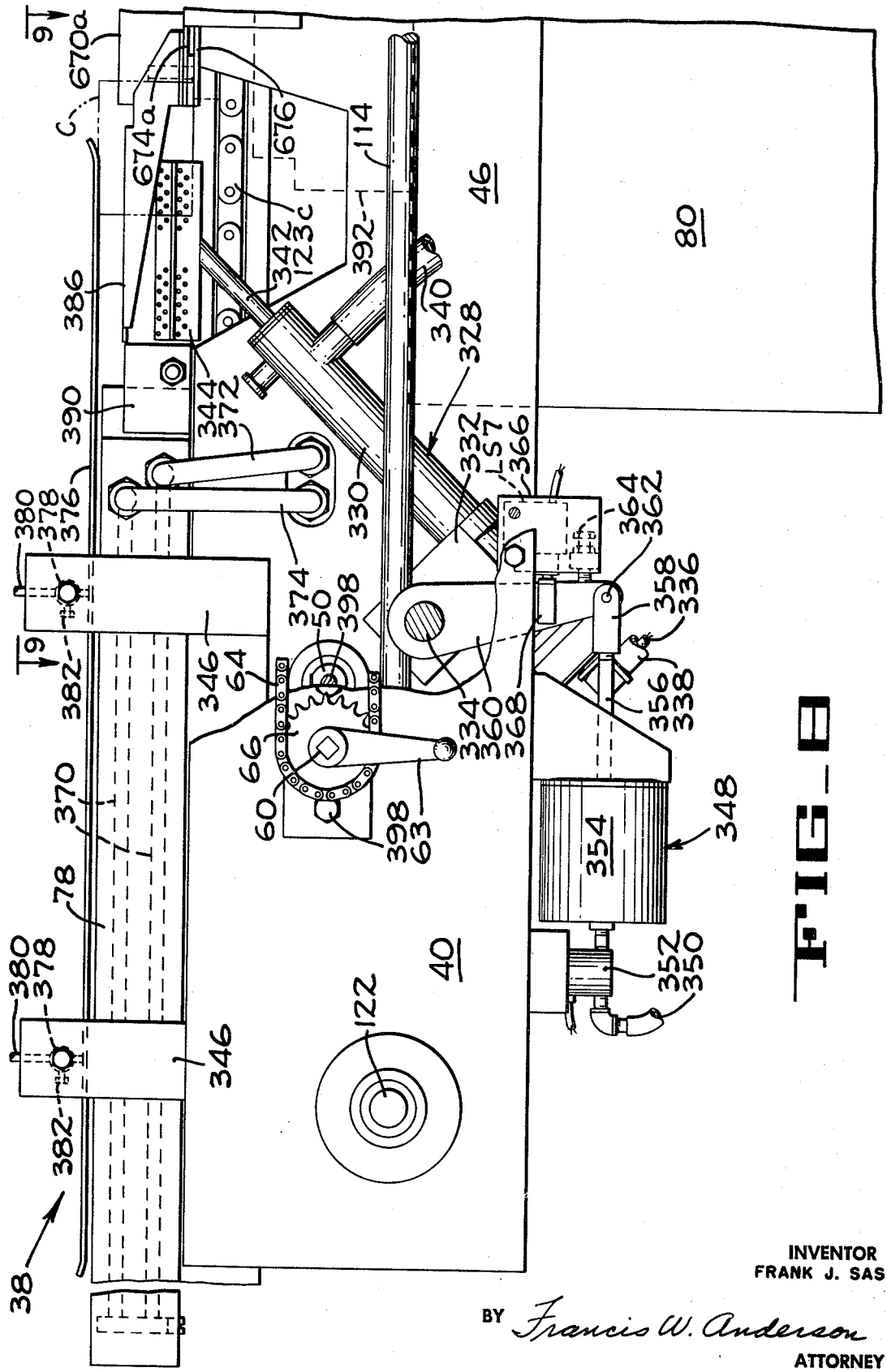

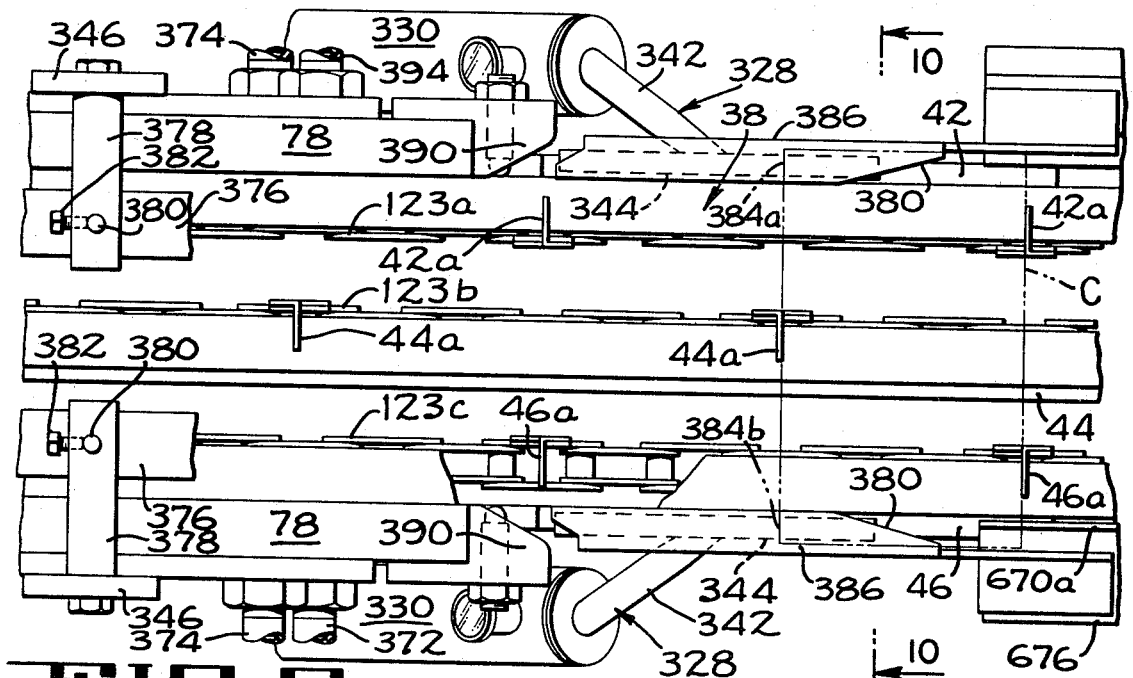
FIG_9
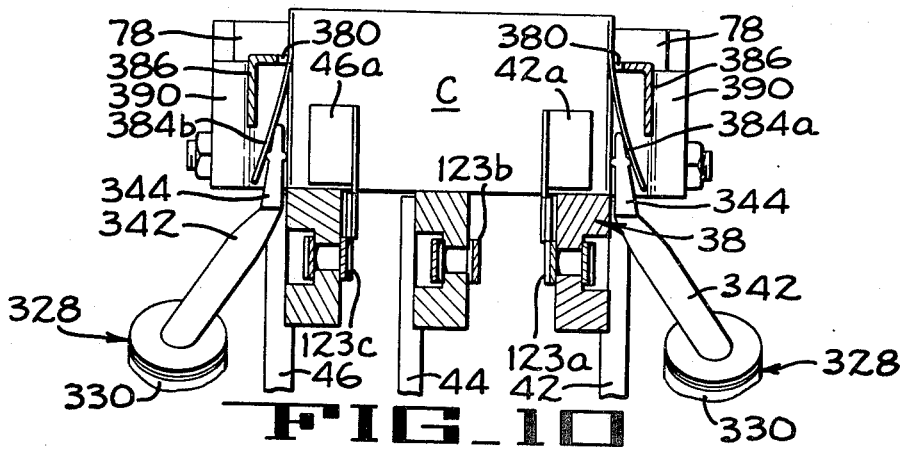
FIG_10
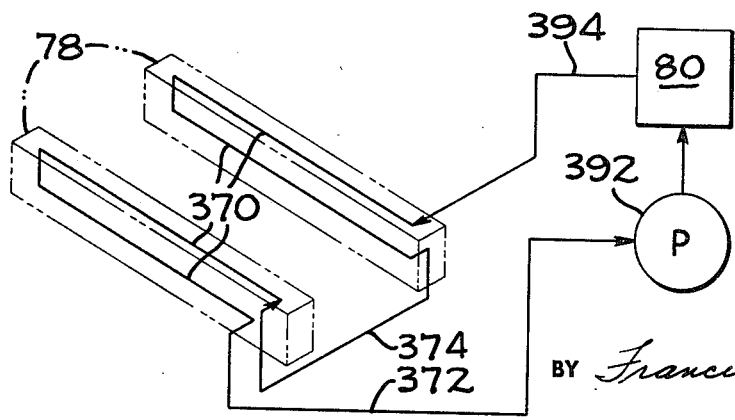
FIG_11
INVENTOR
FRANK J. SASS
BY Francis W. Anderson
ATTORNEY

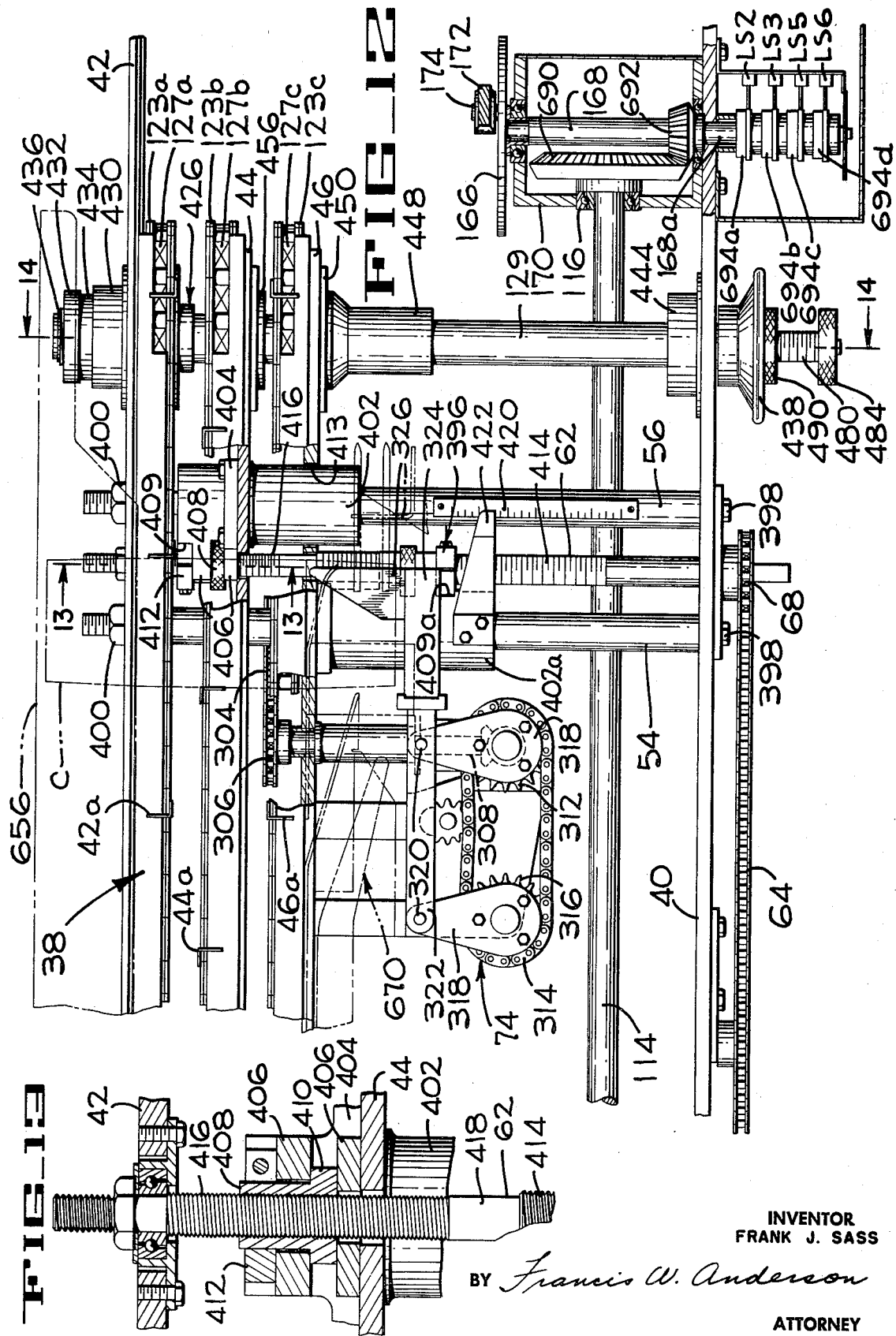

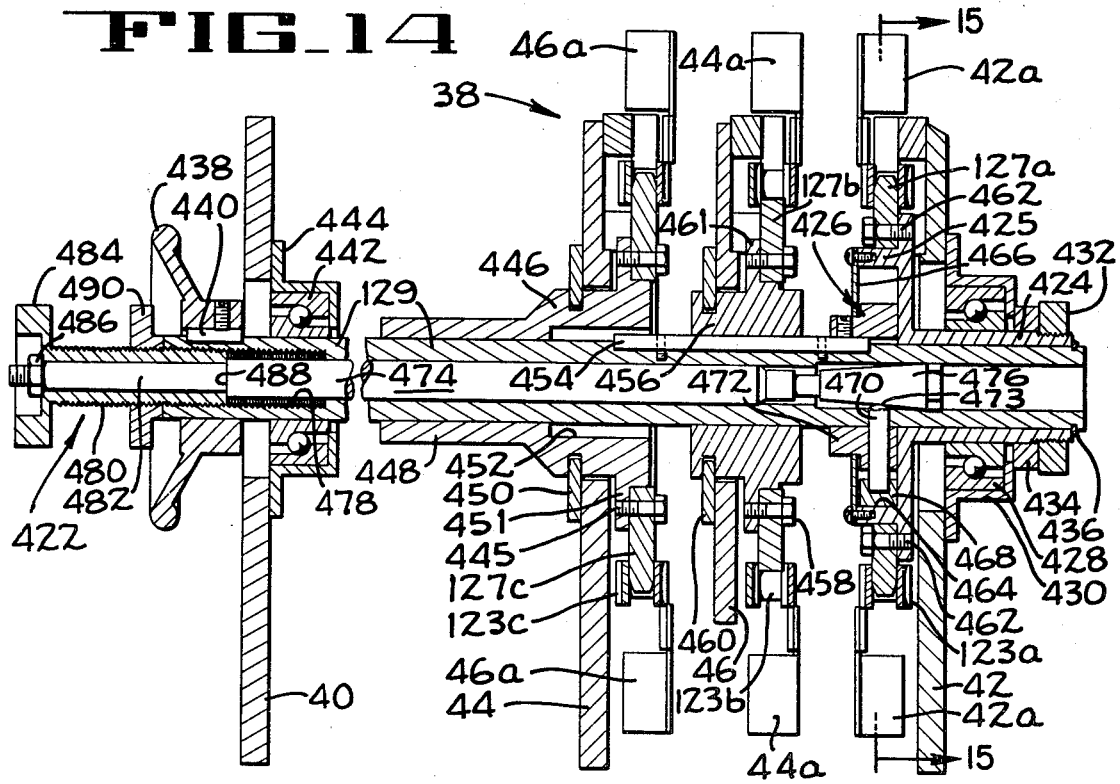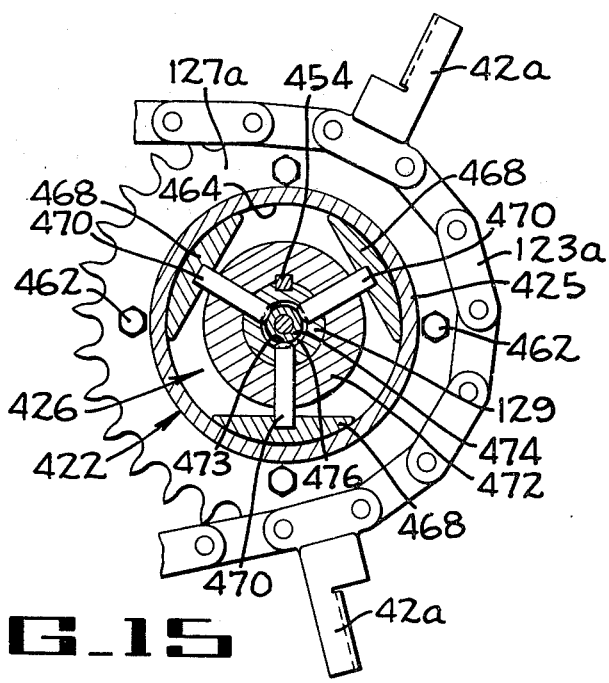

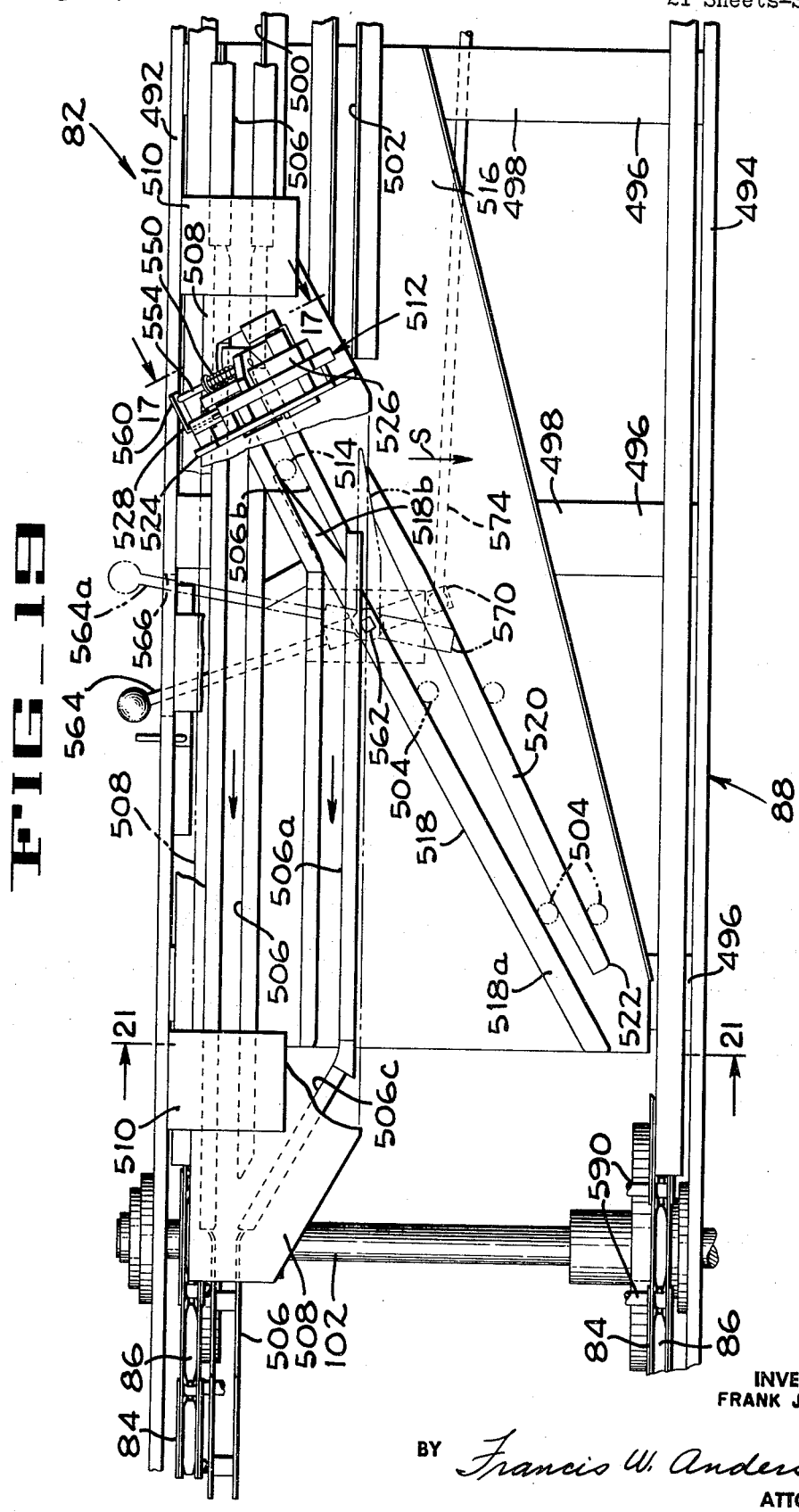

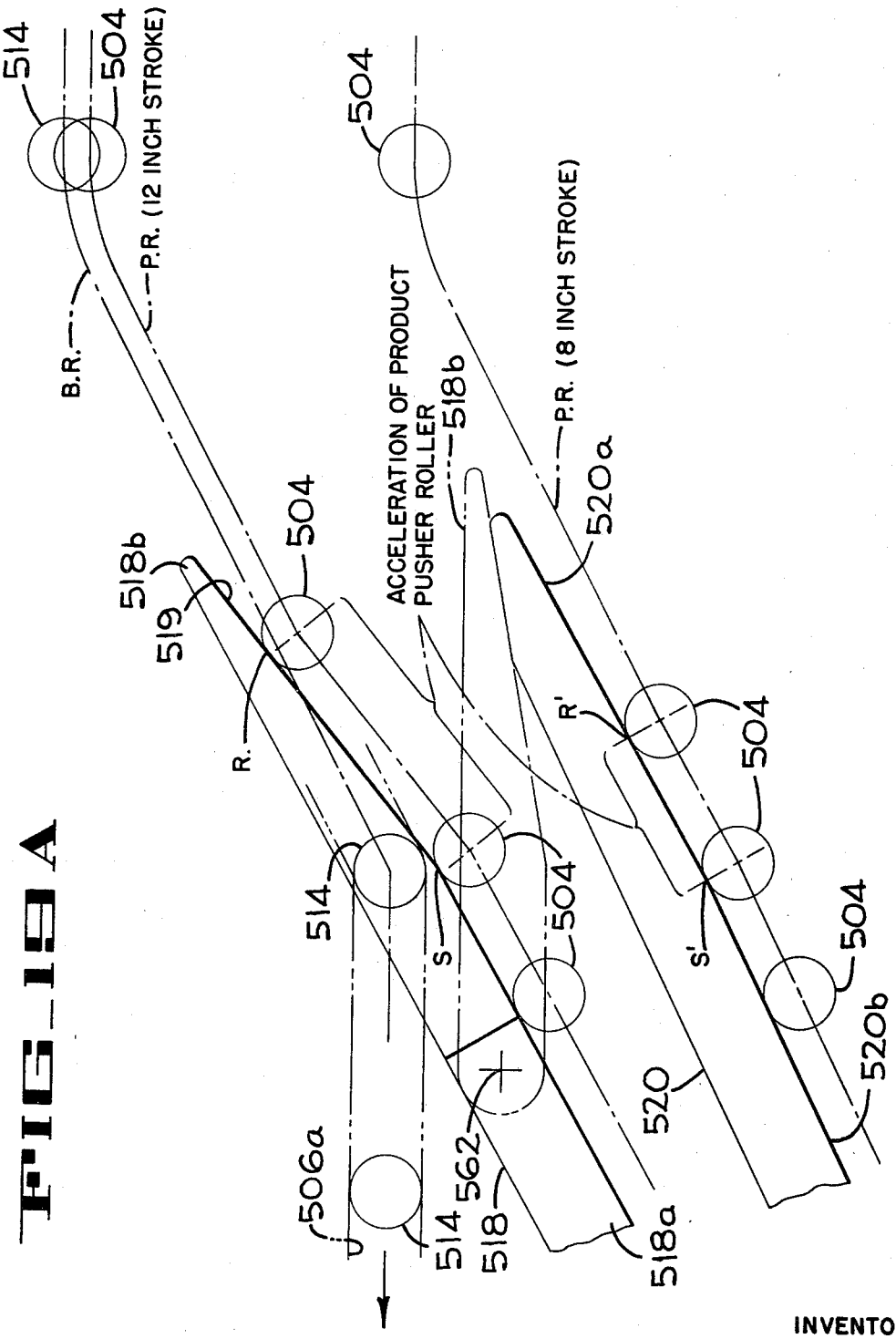

May 5, 1970

F. J. SASS 3,509,681

CARTONING MACHINE AND METHOD

Filed Aug. 25, 1966

FIG_20

INVENTOR
FRANK J. SASS

BY *Francis W. Anderson*
ATTORNEY

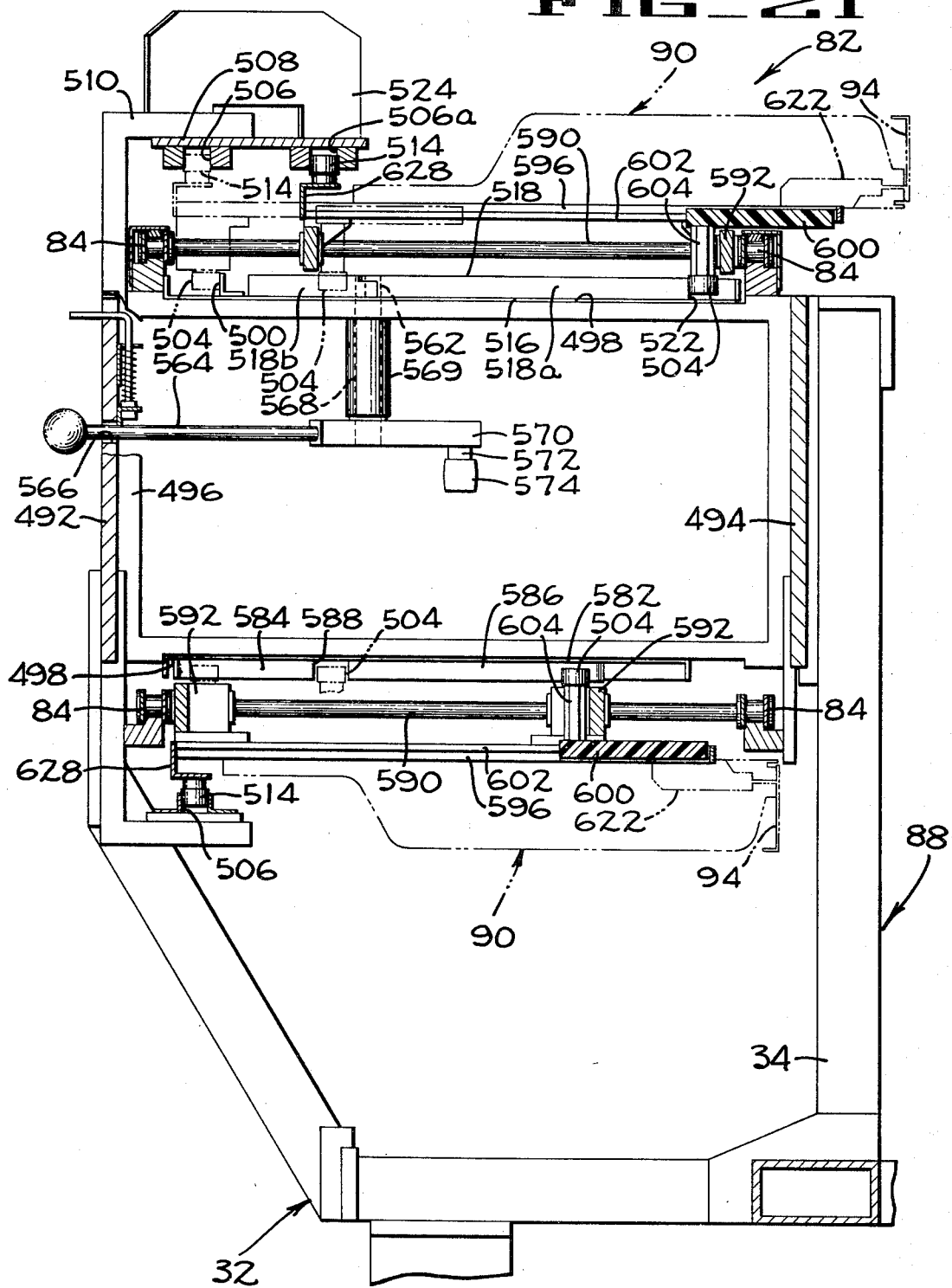

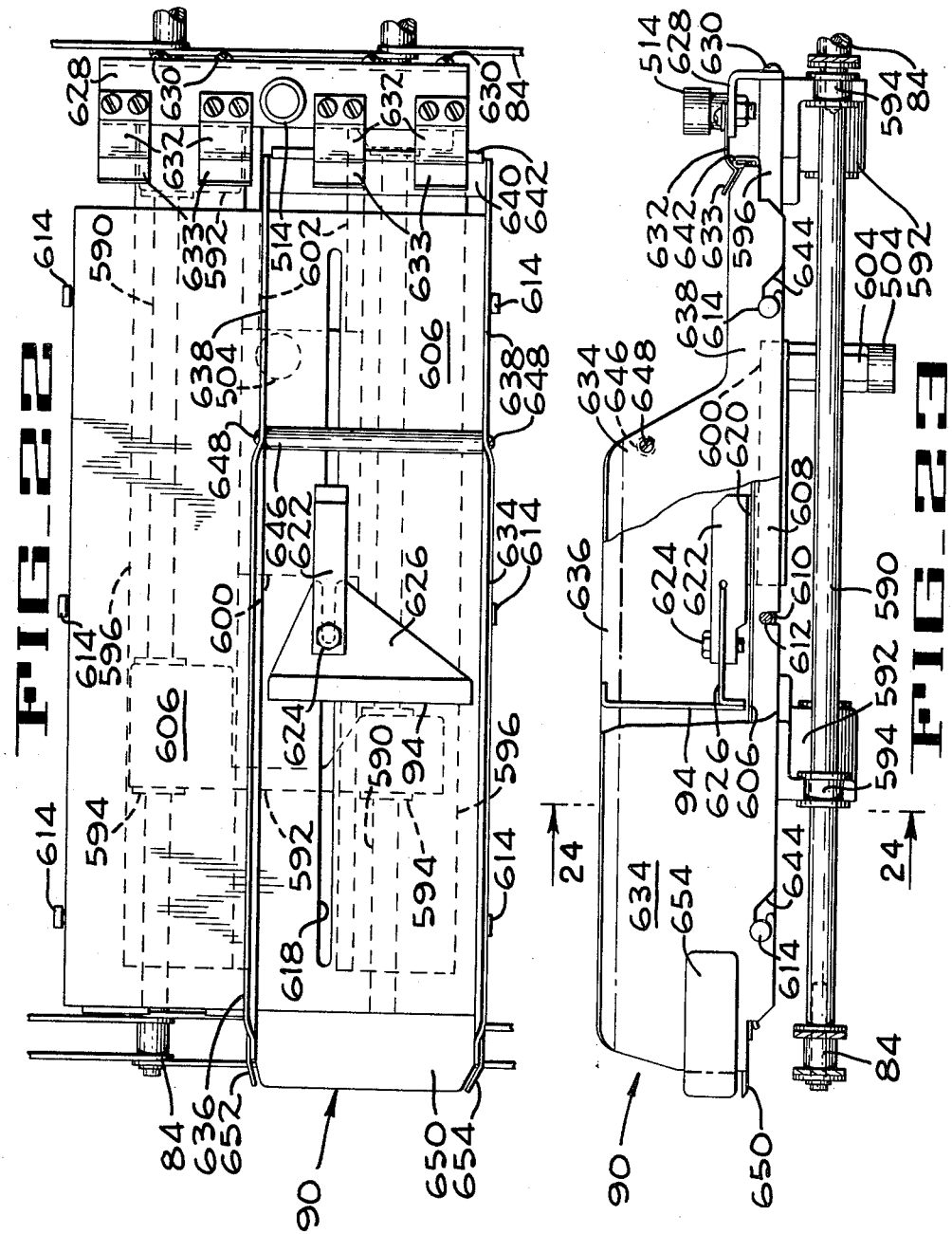

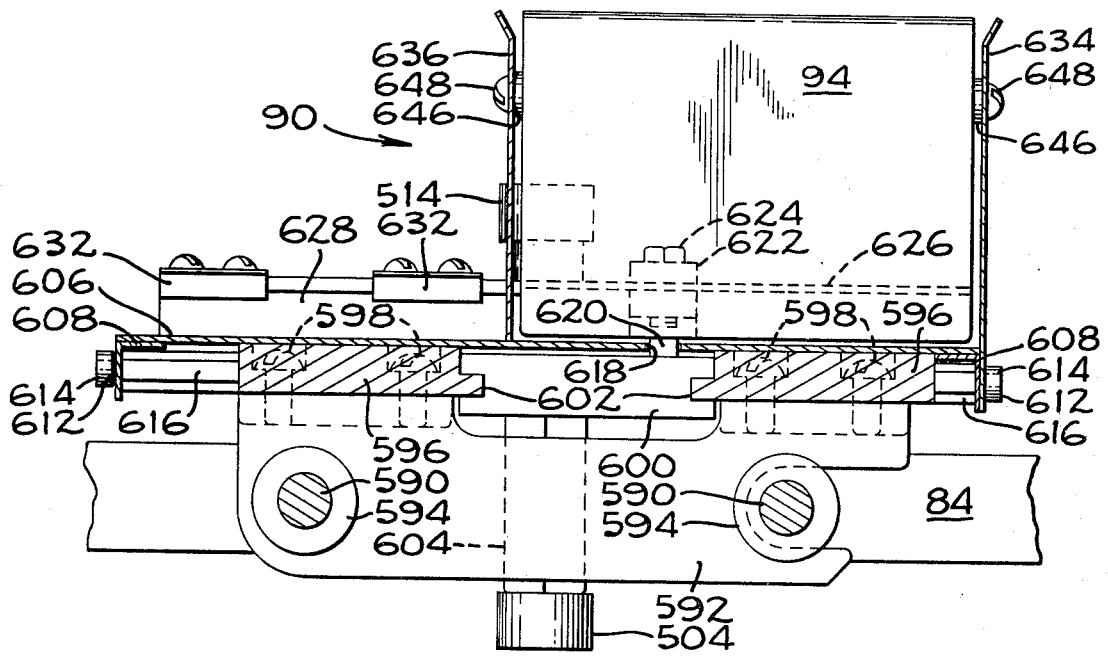
FIG_24
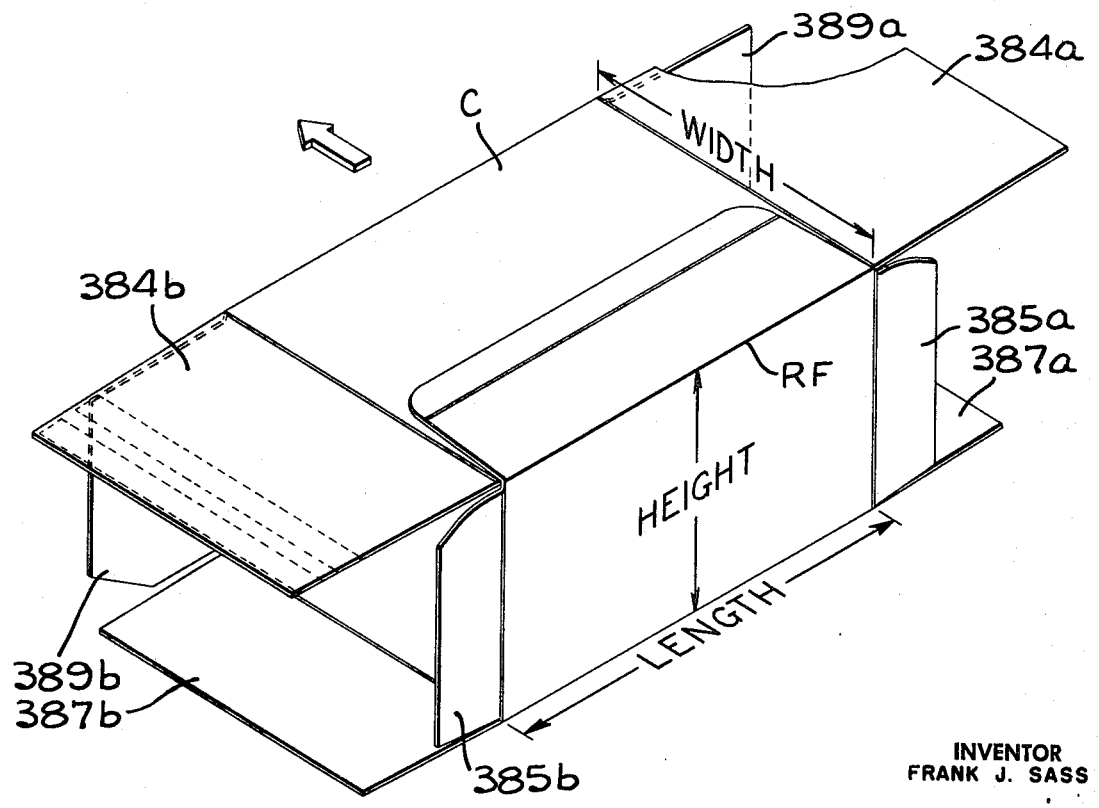
FIG_25
INVENTOR
FRANK J. SASS
BY *Francis W. Anderson*
ATTORNEY

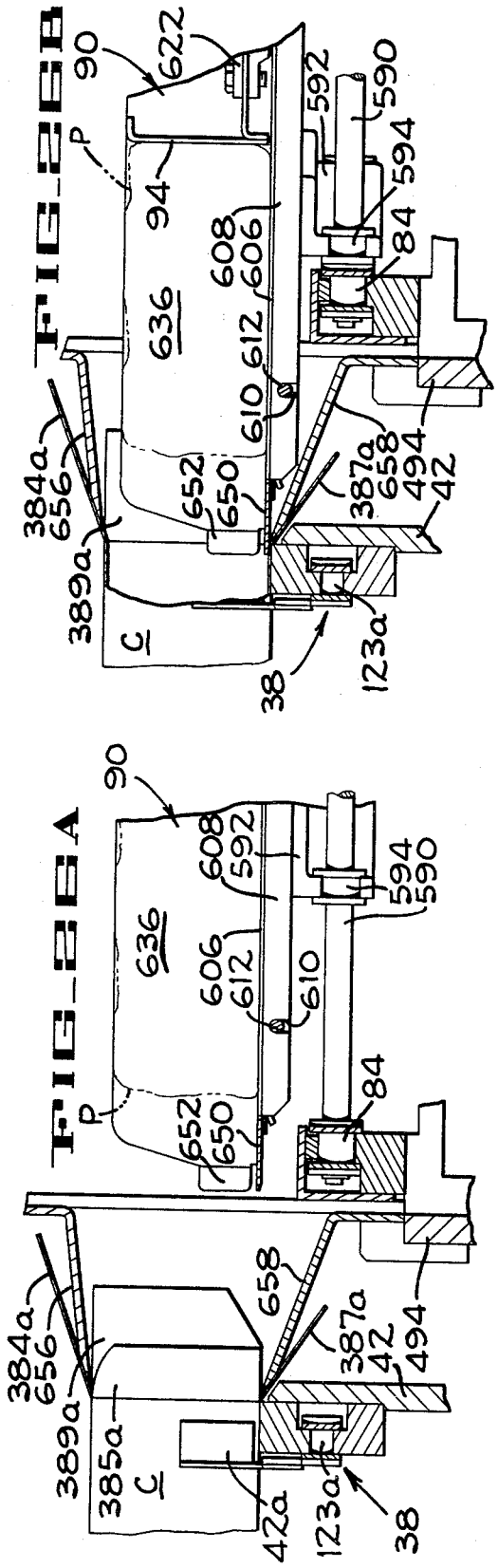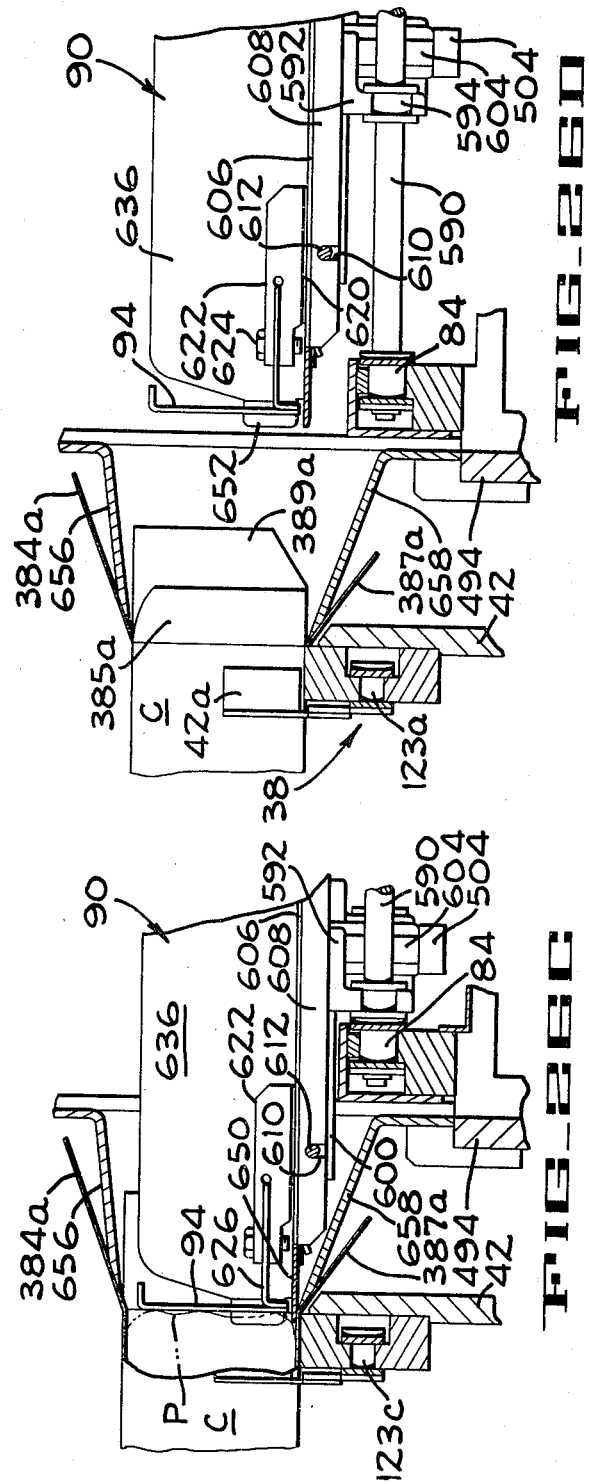

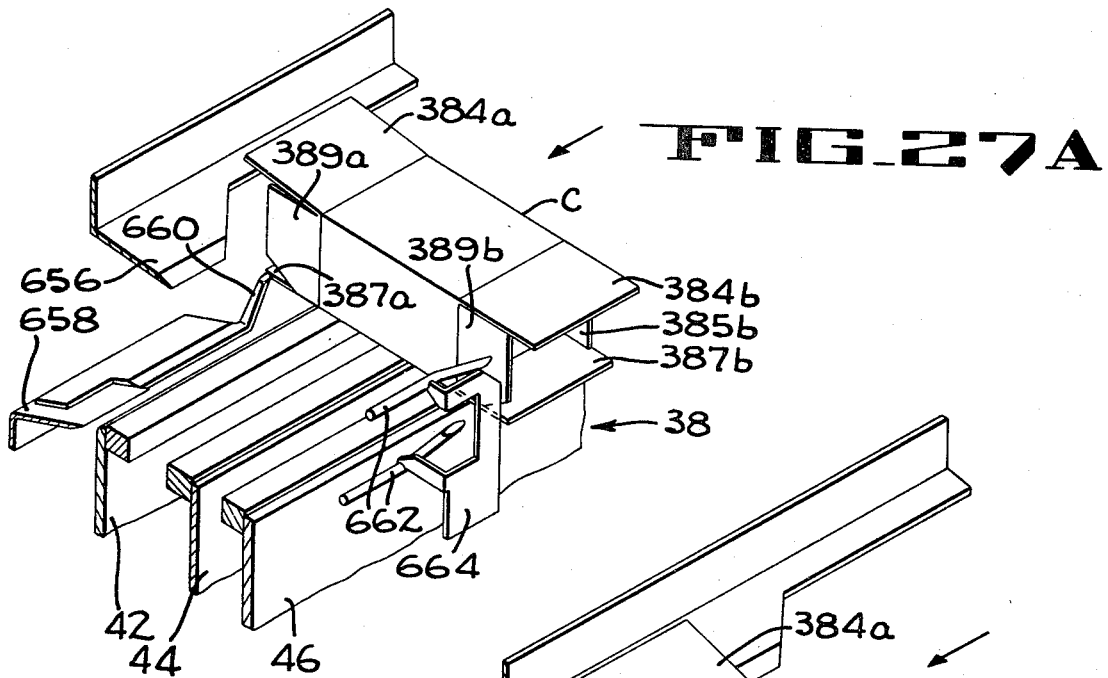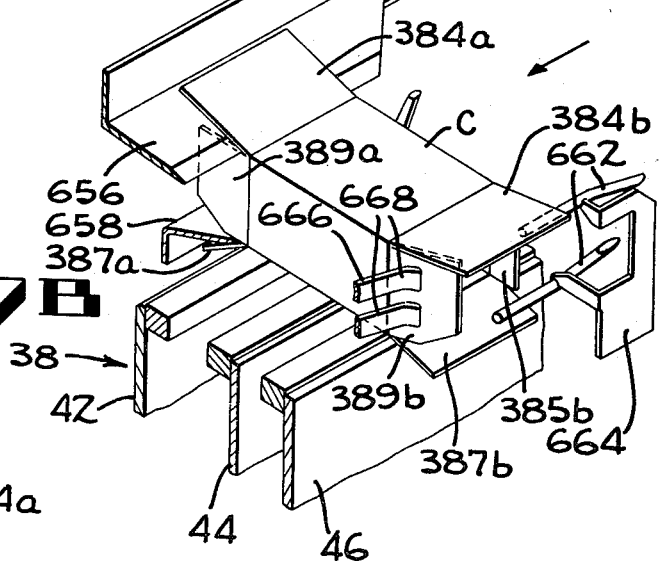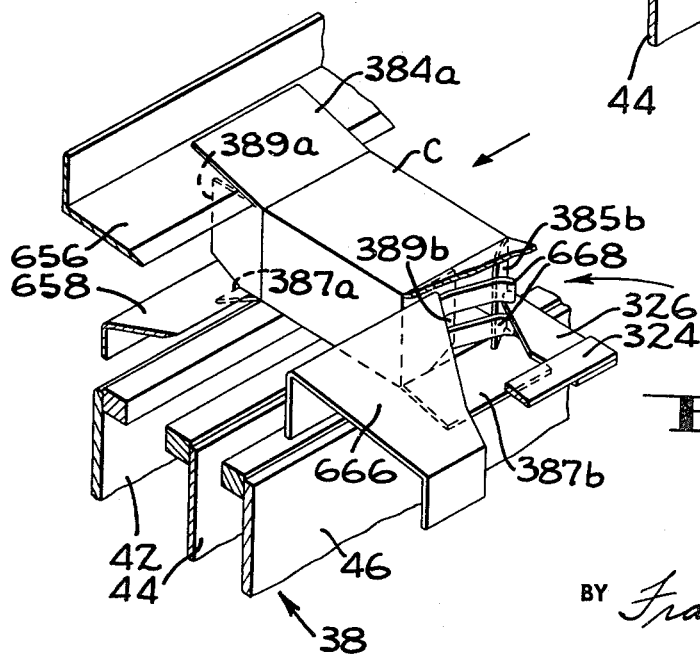

May 5, 1970 F. J. SASS 3,509,681
CARTONING MACHINE AND METHOD
Filed Aug. 25, 1966 21 Sheets-Sheet 18
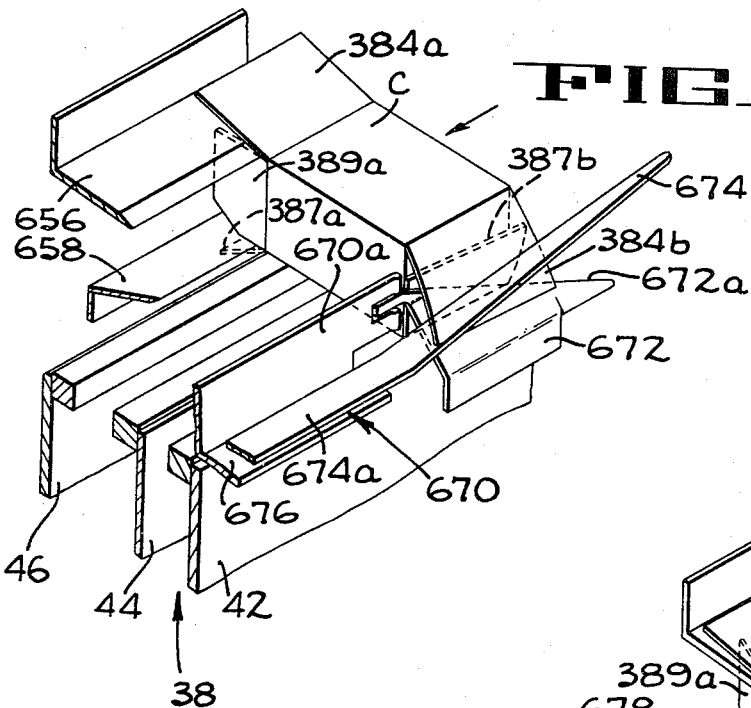
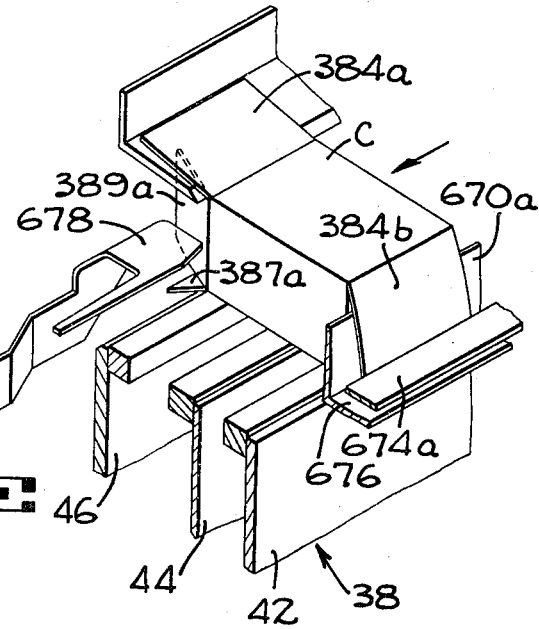
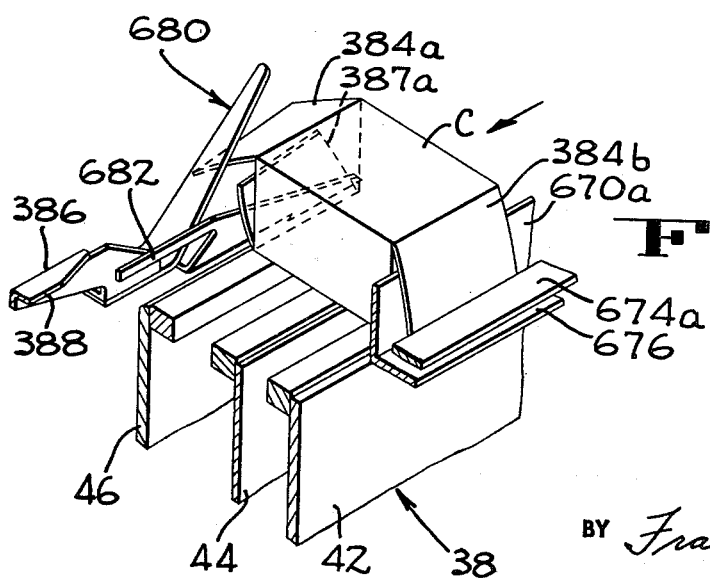
INVENTOR
FRANK J. SASS
BY *Francis W. Anderson*
ATTORNEY

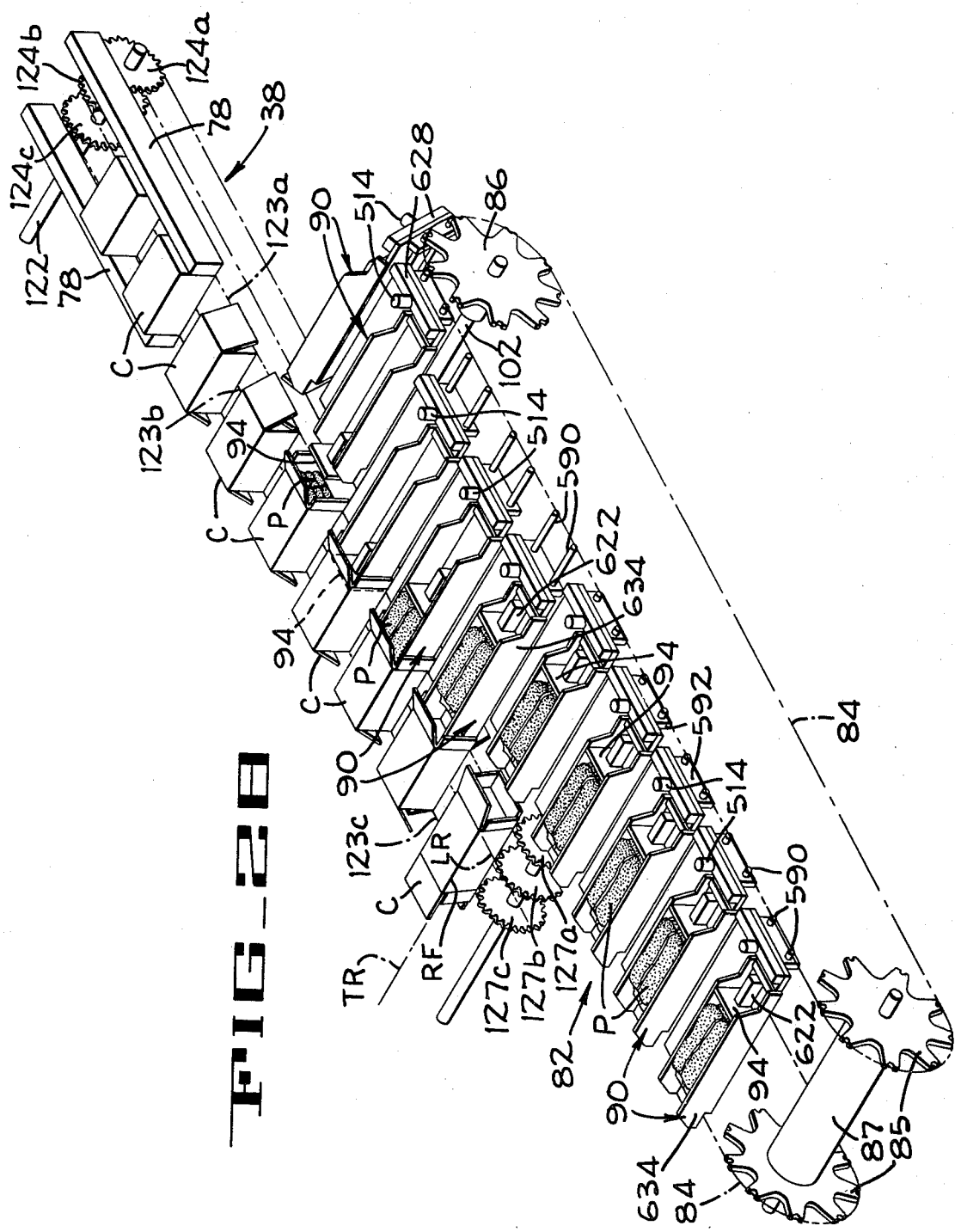

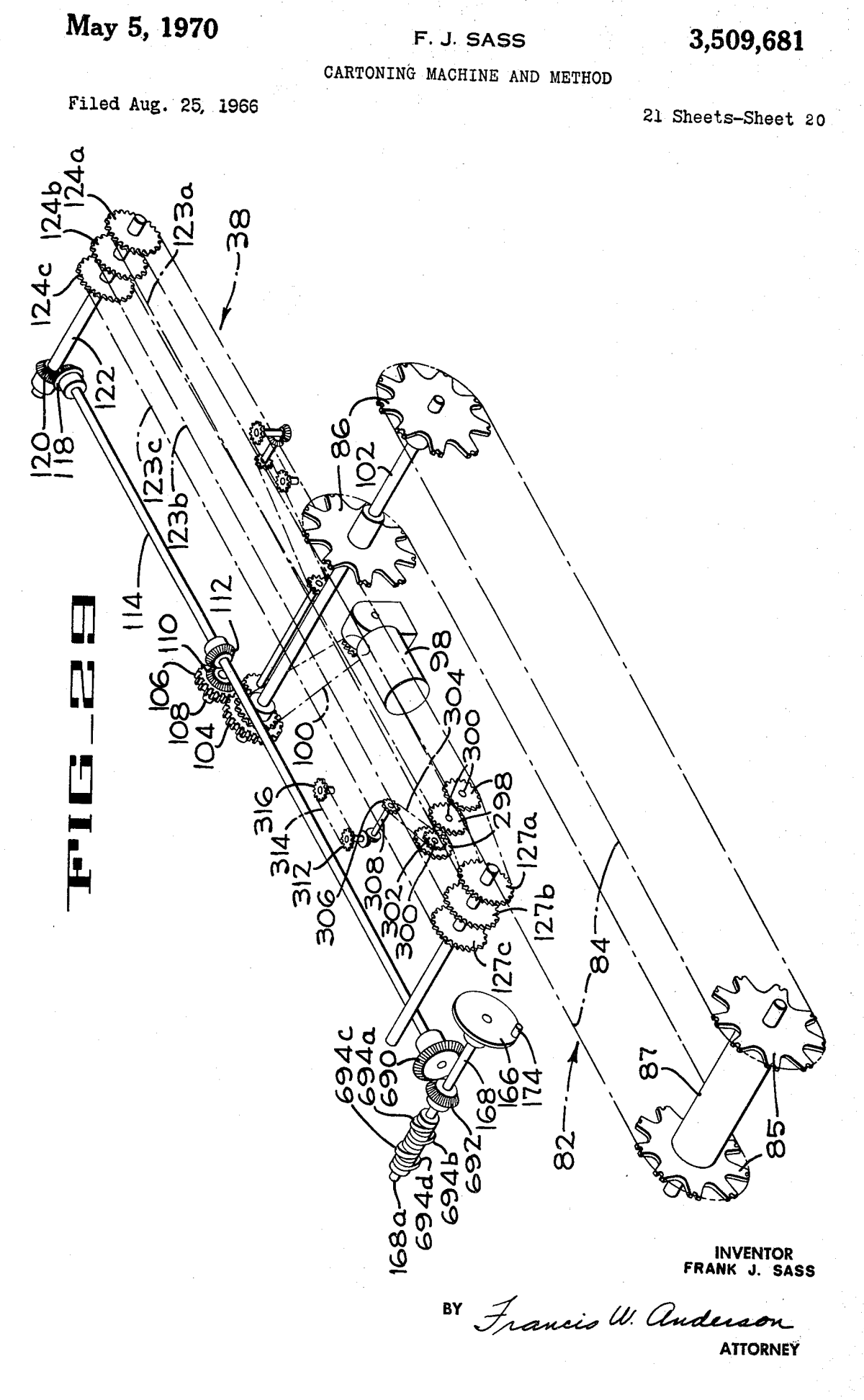

FIG_29

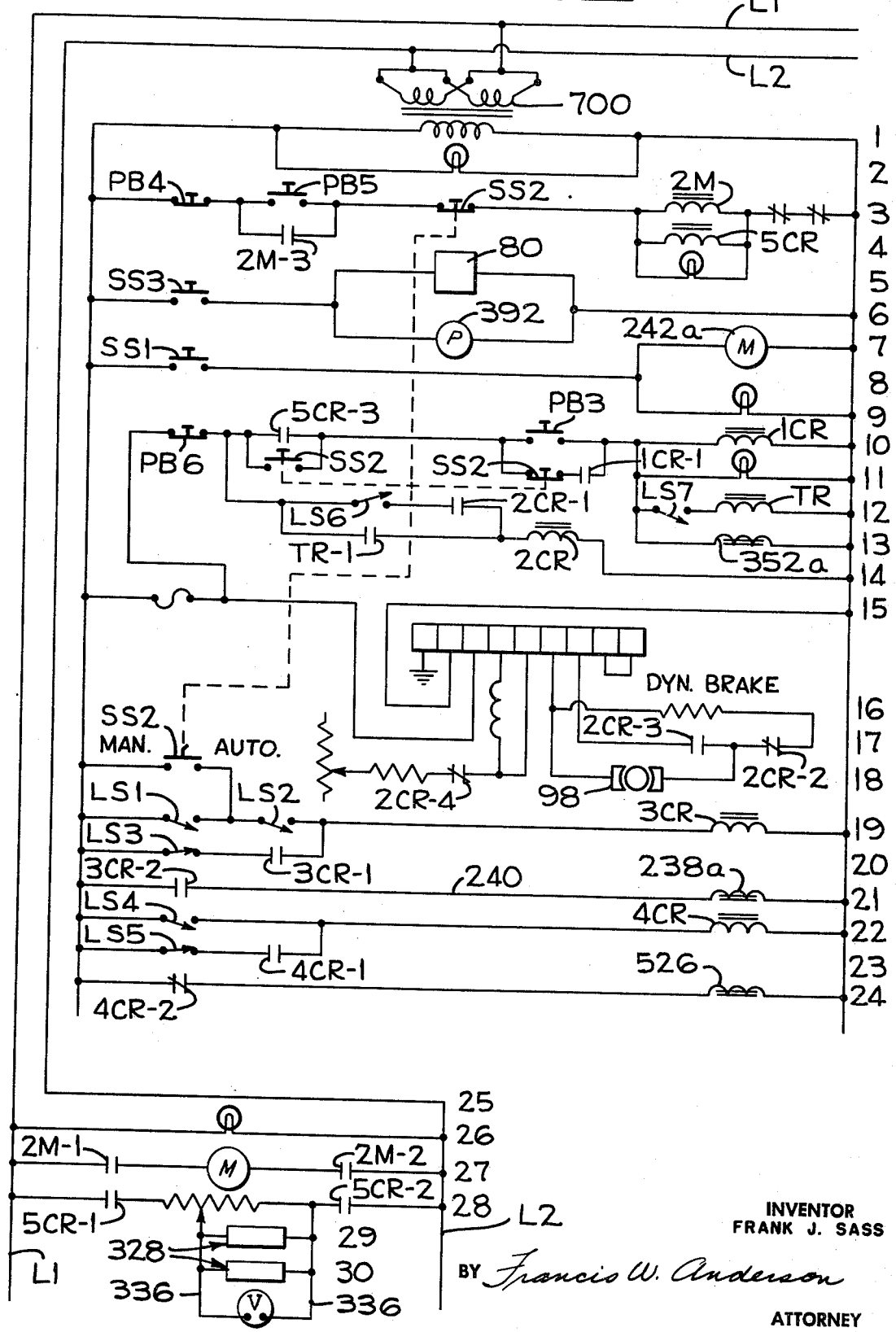

United States Patent Office 3,509,681
Patented May 5, 1970

3,509,681
CARTONING MACHINE AND METHOD
Frank J. Sass, Elverson, Pa., assignor to FMC Corporation, San Jose, Calif., a corporation of Delaware
Filed Aug. 25, 1966, Ser. No. 580,139
Int. Cl. B65b 5/06
U.S. Cl. 53—35                                    14 Claims

ABSTRACT OF THE DISCLOSURE

The present disclosure relates to a machine and method for inserting various products, particularly food products packaged in flexible thermoplastic film, in board cartons. The disclosed machine is provided with a magazine storing a stack of collapsed cartons. A carton transfer and erecting head removes and places expanded cartons on a carton conveyor provided with carton flap closing plows. Longitudinally adjacent the carton conveyor a product conveyor is provided which has product containing receptacles or buckets in transverse alignment with the location of the cartons and they travel at the same speed as the carton conveyor. Camming tracks are associated with the product conveyor for the purpose of translating the receptacles or buckets toward and into an aligned carton. Translation of the receptacles is terminated after it has entered the carton and a pusher, also actuated by cam track, moves relative to the bucket toward the carton to thereby insert the product into the carton. The cam tracks thereafter move the buckets out of the filled carton and the flaps at the loading end of the carton are plowed closed. At the discharge end of the machine suitable means are provided, such as hot air guns, for conditioning hot melt adhesive to securely close the cartons.

---

This invention relates to a cartoning machine and method and more particularly to a machine and method for shaping and inserting flexibly wrapped product, for example, granular or particulate material contained in a pouch of paper, metal foil, or plastic web material, in an erected carton.

Carton machines of this general nature are disclosed in U.S. Patents 1,587,556, 2,631,767, 2,644,625, 2,662,355 and 2,907,155. The present invention discloses several novel improvements over the teachings of these patents and other known prior practices.

The cartoning machine of the present invention is similar to those shown in one or more of the above patents by providing a carton conveyor and a laterally adjacent product conveyor including mechanisms for moving the product into the carton while both conveyors are moving. With the exception of the machine shown in Patent 2,631,767 all of the other indicated machines are designed to handle rigid or rigidly packaged products such as shoe heels, tubes, bottles and other similar dimensionally rigid products or containers. Due to their rigidity, these articles are relatively easy to insert into the cartons since their inherent stiffness allows them to bridge the gap between the product conveyor and the carton conveyor without sagging or assuming a shape which would interfere with the walls of the carton.

In accordance with the present invention the product conveyor is provided with receptacles or buckets which are designed to partially enter the carton prior to the insertion of the product. This serves two functions. First, the bottom wall of the receptacle provides a ramp or bridge supporting the product as it is being transferred into the carton. Secondly, the lateral side walls of the receptacle rigidifies the erected carton during transfer of the product. This, of course, insures insertion of the product into the carton without causing injury to the pouch and it also insures proper registration of the product receptacle and the carton before insertion.

As is customary in this type machinery, there is also provided a carton magazine holding a supply of collapsed cartons which are deposited on the carton conveyor in timed relation with the movement of the conveyor. It is a feature of this invention to provide a novel transfer mechanism for removing collapsed cartons from the magazine and presenting them to the carton conveyor in an expanded condition. During transfer of the carton a novel association of mechanisms, preferably vacuum cups and erecting fingers, are mounted on the transfer arm and they have the ability to overbreak the carton along its longitudinal score lines before the carton is deposited on the conveyor.

Further, in accordance with this invention there is provided a novel carton conveyor which is constructed and arranged to handle cartons of different lengths and widths while maintaining the loading end of the carton in a predetermined position. To achieve this objective, the carton conveyor is provided with three side-by-side lug carrying chains which are mounted for movement on sprockets carried by three support plates. Two of these support plates, namely the intermediate one and one outer one, are laterally movable relative to the remaining outer support plate in such a manner that the lugs of the intermediate support plate are substantially midway between the lugs associated with the outer support plates. In this way, when cartons of longer length are to be carried by the carton conveyor, the lugs firmly engage the carton in such a manner that bending or skewing of the carton is positively prevented.

It is another feature of the carton conveyor to be quickly adjustable to handle cartons of different widths. The sprocket chains carrying the lugs are mounted on a common driven shaft and a common idler shaft. A novel clutch arrangement is provided on one of these shafts, which is easily accessible to the operator that is adapted to allow displacement of the inner lug carrying chain relative to the lugs carried by the outer chains. The degree to which the lugs on the center chain are displaced is dictated by the width of the carton.

In accordance with another feature of this invention, cartons having heat sealable end flaps are gently longitudinally compressed and quickly cooled to harden the preapplied adhesive. This function is fulfilled by elongate bars located at the end portion of the carton conveyor. These bars are constructed so that a refrigerated fluid passes therethrough to effect such rapid cooling of the adhesive.

Further, and in accordance with the invention, there is provided a novel control system whose basic purpose is to prevent discharge of the product from the buckets in the event there is no erected carton at a particular corner of the carton conveyor for receiving such product. In addition should there be a bucket which does not contain product, or the desired quantity of product, transfer of a carton from the magazine to the carton conveyor is prevented. Therefore, stated concisely, when there is no product, no carton will be made available; when there is no carton, the product will not be discharged from the buckets. The control system is provided with electrical devices which will stop the machine at a certain point of its cycle in order to preclude the possibility of positioning a carton at hot air distributing nozzles which serve the function of rendering the preapplied adhesive tacky so that the package may be sealed. When the machine is stopped, it continues operation until a cycle is completed. This assures starting at the beginning of a cycle when the machine is again set in operation.

These and other features and advantages and objects of this invention will become apparent upon consideration of the following description in conjunction with the accompanying drawings in which:

FIG. 1 is a plan view of a cartoner machine incorporating the novel apparatus of the present invention, FIG. 2 is a side elevation of FIG. 1, FIG. 3 is an enlarged elevation, partly in section of the carton magazine and the transfer mechanism taken substantially along the line 3—3 of FIG. 1, FIG. 4 is a plan of the carton magazine as viewed in the direction of the arrows 4—4 of FIG. 3, FIG. 5 is a longitudinal section of FIG. 4 taken substantially along the line 5—5, FIG. 6 is a right side view of FIG. 5.

FIGS. 7A and 7B, when joined at the break line BL, show a longitudinal section of the carton conveyor taken substantially along the line 7—7 of FIG. 1, FIG. 8 is an enlarged fragmentary view partly in section of the discharge end of the carton conveyor showing details of the chill bars and the heat distributing nozzles, FIG. 9 is a partial plan view, looking in the direction of arrows 9—9 of FIG. 8, FIG. 10 is a transverse section of FIG. 9 taken substantially along the line 10—10, FIG. 11 is a schematic of the refrigerant system for the chill bars, FIG. 12 is an enlarged plan of the inlet end of the carton conveyor, partly in section, when viewed in the direction of the arrows 12—12 of FIG. 7A.

FIG. 13 is an enlarged section of FIG. 12 taken substantially along the line 13—13 illustrating the carton length adjusting mechanism, FIG. 14 is an enlarged section of FIG. 12 taken substantially along the line 14—14 showing the carton width adjusting mechanism, FIG. 15 is a transverse section of FIG. 14 taken substantially along the line 15—15, FIG. 16 is an enlarged longitudinal section of the receptacle or bucket conveyor, taken along line 16—16 of FIG. 1, FIG. 17 is an enlarged view of a switch for the bucket displacing cam tracks as it appears when viewed in the direction of the arrows 17—17 of FIG. 19, FIG. 18 is a fragmentary horizontal section taken along line 18—18 of FIG. 17, portions being broken away, FIG. 19 is an enlarged partial view of FIG. 16 as viewed in the direction of the arrows 19—19, FIG. 19A is an enlarged fragmentary portion of FIG. 19, FIG. 20 is an enlarged partial longitudinal transverse section of FIG. 16 taken substantially along the line 20—20, FIG. 21 is a transverse section of FIG. 19 taken substantially along the line 21—21, FIG. 22 is a plan view of a bucket or product receptacle, FIG. 23 is a side elevation of FIG. 22, FIG. 24 is a transverse section of FIG. 23 taken substantially along the line 24—24, FIG. 25 is a perspective of one type of carton that can be handled by the cartoning machine of the present invention and for purposes of description this carton is of the type having preapplied adhesive on its closing flap, FIG. 26A to 26D are sequential views showing the relationship of the carton and the product receptacle before, during and after insertion of the product in the carton, FIGS. 27A, 27B, 27C, 27D, 27E and 27F show the action of the carton flap closing plows as the cartons are conveyed to the discharge end of the carton conveyor, FIG. 28 is a diagrammatic view illustrating the cooperation of the carton and product conveyors during the carton filling operation, FIG. 29 is a diagrammatic view of the drive train for the carton and bucket conveyors, and FIG. 30 is an electrical schematic of the electrical control circuit.

General arrangement

The main components of the cartoning machine incorporating the features of this invention are shown in FIGS. 1 and 2, wherein the machine as a whole is generally indicated by the numeral 30. On a support frame 32, including legs 34 and longitudinal interconnecting support braces 36 there is mounted an elongate carton conveyor 38. This conveyor comprises an outer side frame member 40 and a similar inner frame 42. Each frame is secured to the support 32. Mounted for transverse slidable movement between the frames 40 and 42 there are intermediate sprocket chain carrying plates 44 and 46. These plates are slidably movable on longitudinally spaced transverse guide bars 48, 50, 52, 54 and 56 with the ends of these guide gars attached to frame members 40 and 42. Adjustment means which include threaded rods 60 and 62 and a sprocket chain 64 trained about sprockets 66 and 68, are provided for moving the plates 44 and 46 laterally inwardly or outwardly relatively to the inner frame member 42.

At the inlet end of the carton conveyor 38 and supported on the side frame members 40 and 42 there is provided a carton magazine 70 including a transfer mechanism 72 operated in timed relation with the carton conveyor for removing cartons C, maintained in a collapsed condition, from the magazine and placing them in an expanded condition onto the carton conveyor 38. The carton conveyor has sprocket chains 123a, 123b and 123c (FIGS. 12 and 14) carrying respectively outwardly projecting lugs 42a, 44a and 46a. The transfer mechanism 72 places an erected carton between the lugs which maintain the carton in its erected condition as it passes along the carton conveyor. Conventional plows, mechanisms and oscillating devices 74 and 76 are provided for closing the end flaps of the carton. It is to be observed that the mechanism 74 is located in close proximity to the transfer mechanism 72 and that the mechanism 76 is downstream and on the opposite side of the carton conveyor 38. Each of these mechanisms are effective to turn the trailing dust flap on each end of the carton inwardly.

Although the cartoning machine of the present invention is able to handle all the known variety of carton styles, that is, lock style, heat sealing cartons and hot melt cartons, it will be explained in connection with cartons having a preapplied heat activated adhesive applied to selected portions of the closing flaps. After the carton has been filled and the end flaps have been folded, they encounter heat applying mechanisms 328 (FIG. 7B) positioned to direct heated air to the preapplied adhesive. This renders the adhesive tacky. Immediately thereafter the cartons pass between laterally spaced elongate rails or bars 78 provided with channels through which flow a regfrigerated fluid serving to harden the adhesive while at the same time, the rails press the end flaps of the carton inwardly to effect sealing. The elongate bars 78, sometimes hereinafter referred to as chill bars, function to reharden the adhesive which has been rendered tacky by the heat applying mechanisms 328. Supply of cooled fluid is provided by a suitable pump which is connected to a refrigerating unit 80 which per se does not form part of the present invention.

As shown in FIG. 1, a receptacle or bucket conveyor 82 is mounted parallel to and partially longitudinally coextensive with the carton conveyor 38. This conveyor comprises a pair of laterally spaced sprocket chains 84 (only one of which appears in FIG. 2) trained about sprockets 85 and 86 which are secured to shafts 87 and 102. The frame structure 88 of the bucket conveyor 82 is also carried in part by the legs 34. At regularly spaced intervals, and extending between the sprocket chains 84 there are provided receptacles or buckets 90 which may carry a single or multiple stacked items desired to be inserted in the carton C. Items desired to be cartoned are supplied to the bucket conveyor 82 by a suitable conveyor 92. Cam mechanisms are carried by the bucket conveyor for translating the buckets toward the carton conveyor a sufficient distance so that they partially enter the carton before the product is discharged into the carton. Each bucket is provided with a rearward movable wall 94, sometimes hereinafter referred to as a pusher, which is also translated by a cam serving to transfer the product from the bucket into the carton. Means are provided on the bucket conveyor 82 for sensing the presence of product in each bucket before the bucket comes under the influence of the translating cam. These means are generally indicated by the numeral 96 and are arranged to actuate a limit switch incorporated in the control circuit of the machine. In the event there is insufficient or no product in a bucket the transfer mechanism 72 is conditioned to prevent transfer of a carton and the bucket does not engage the translating cam. After the product has been discharged into the carton, each bucket retracts to its original position.

The carton conveyor 38 and the bucket conveyor 82 are driven by a motor 98 driving a sprocket chain 100 secured to the transverse shaft 102. This shaft also carries a gear 104 meshing with a gear 106 mounted on a short stub shaft 108 rotatably mounted on the outer side frame 40. Also carried on the stub shaft 108 is a bevel gear 110 in mesh with another bevel gear 112 rigidly secured to a longitudinal shaft 114 mounted in suitable bearings 116. As shown in FIG. 1, one end of the shaft 114 carries a bevel gear 118 in mesh with another bevel gear 120 keyed to a shaft 122 rotatably mounted in the outer side frame 40 and the inner side frame 42. On this shaft, the driving sprockets 124a, 124b and 124c (one of which is shown in phantom in FIG. 2) are suitably mounted. The sprockets 124a, 124b and 124c drive the sprocket chains 123a, 123b and 123c which are trained about idler sprockets 127a, 127b and 127c, respectively. As will be explained in connection with FIG. 12, the other end of the shaft 114 is connected to drive the transfer mechanism 72 and a plurality of timing cams for actuating limit switches.

Carton magazine and transfer mechanism

Referring now to FIG. 3 which shows an enlarged side elevation of the carton magazine and the transferring mechanism it will be seen that an upwardly extending mounting frame 125, including a forward extension 126, is rigidly attached to the side frame member 40. The carton magazine 70 is supported in the position shown on the upper end of the frame 125 and it is associated with positioning devices 128 and 130 which serve, respectively, to adjust the carton magazine for the height and the width of the carton being processed. These dimensions are indicated on the carton shown in FIG. 25. One score line of the carton designated by the letters RF is the reference score line for making the adjustments of height and width. When the carton is in a collapsed condition in the magazine 70 this score line faces forwardly and it is located by means of the mechanisms 128 and 130 a certain vertical distance from the plane in which the bottom wall of the carton is located when it is deposited on the carton conveyor 38. The frame 125 is formed with a bracket 132, carrying an upwardly extending guide rod 134 and a linear guideway 136. Slidably mounted on the rod 134 and in the guideway 136 is a support arm 138 formed with an inwardly extending cantilevered beam portion 140 on the end of which is secured a T block 142 slidably fitted in guideways 144. There is bolted to the T block an elongate base plate 146 supporting lateral guides 148 (FIG. 3) of the carton magazine 70.

Movement of the support arm 138 along the guide rod 134 is accomplished by a lead screw 150 extending through a suitable clearance hole in the bracket 132 and is provided with a crank 152. The lead screw is disposed in a threaded nut 154 rigidly attached to the support arm 138. Collars 156 on lead screw 150 prevent longitudinal displacement of the lead screw when it is turned to effect adjustment of the support arm 138. In view of the above it is evident that rotation of the crank 152 will cause upward or downward movement of the carton magazine 70 depending upon the direction in which the crank is turned. For wide cartons the support arm 138 is lowered whereas for narrow cartons the arm is raised.

Since the lateral guides 148 of the carton magazine 70 are located at an angle relative to the conveying run of the carton conveyor 38 the position of the forwardmost carton in the stack relative to the carton conveyor 38 can be adjusted by moving the T block 142 in the guide 144. For this purpose there is provided a lead screw 158 threaded through a boss 160 formed on the cantilever beam portion 140. This lead screw also has a crank 162 pinned thereto which is disposed through a downwardly extending ear 164 which is attached to the T block 142. By virtue of this construction rotation of the lead screw 158 by the crank 162 causes translatory movement of the carton magazine 70 since it is connected to the T block 142 through the base plate 146. In addition to the adjustment mechanism 128 the certain linkages of the transfer mechanism 72 are adjusted to assure proper location of the cartons on the conveyor 38.

In accordance with one of the features of this invention the transfer mechanism 72 is arranged to remove cartons from the magazine 70 and place them on the carton conveyor 38 and in doing so the carton is erected. The manner in which this is accomplished will now be described. Still referring to FIG. 3 it will be seen that the carton transfer mechanism is driven by a plate cam 166 which is secured to a shaft 168 forming an output of a gear box 170 which is driven by the longitudinal shaft 114 (FIG. 12). A connecting rod 172 has one end rotatably mounted on a drive pin 174, carried by the plate cam 166, and the other end pivotally connected to another pin 176 secured to one arm 178 of a bell crank 180. Carried by the mounting frame 125 is a short stub shaft 182 on which is rotatably mounted the bell crank 180 and a link 184 which is attached to the bell crank 180 by bolts 186. As shown, these bolts extend through arcuate slots 188 which serve to adjust the angular relation between the link 184 and the bell crank 180. This adjustment is made to correspond with the height of the carton.

Rotatably mounted on the free end of the bell crank 180 is a carton pickup and erecting head 189. This head is rotatably mounted on a shaft 190 which is in turn rigidly connected to the end of the bell crank 180. Over this shaft there is freely mounted an elongate tubular sleeve 192 which in turn has rigidly connected thereto a vacuum manifold block 194. This block carries a vacuum cup mounting plate 196 supporting vacuum cups 198. Suitable lines or conduits 200 connect each of the vacuum cups 198 with the manifold block 194. The end of the sleeve 192 is formed with an outwardly extending ear to which is pivotally connected at 202 a longitudinally adjustable link 204 which is also pivotally connected at 206 to a rocking lever 208 which is pivotally mounted on the vacuum cup mounting plate 196 at 210. Suitably attached to the rocking lever 208 are a pair of carton erecting fingers 212. As will be explained hereinafter the link 204 serves the purpose of rotating erecting fingers 212 from the carton pickup position to the carton release position for the purpose of overbreaking the carton along its longitudinal score lines before the carton is deposited on the conveyor 38.

A floating link 214 is pivotally connected to the link 184 at 216 and to a bell crank 218 at 220. The bell crank 218 is mounted for rocking movement about a stub shaft 222 and it has an oscillating slider bearing 224 slotted to slidably receive a crank 226. The lower end of the crank 226 is rigidly connected to the sleeve 192 and during actuation of the transfer mechanism it causes relative rotation of the sleeve 192 relative to the shaft 190.

Any slack in the transfer mechanism 72 is taken up by a spring biased rod 228 connected at 230 to the arm 178 and it extends through a bracket 232 serving as a reaction surface for a spring 234 surrounding the lower end of the rod 228.

A vacuum line 236, connected to a solenoid operated valve 238 electrically connected to the control circuit by line 240, establishes communication between a vacuum pump 242 (FIG. 2) and the manifold block 194. In series with the solenoid valve 238, a mechanically operated valve 244, communicating with the vacuum pump 242 by a conduit 246, is provided. This valve has its spool operated by links 248 and 250 which are pivotally interconnected at 252. The link 250 is also mounted on a stationary pivot connection 254 and it carries a cam follower roller 256 engageable with the plate cam 166.

In the path described by the carton as it is tranferred from the magazine 70 to the carton conveyor 38 there is a carton feeler 258 which is arranged to actuate a limit switch LS4 closing a circuit which will allow the bucket or receptacles 90 to be cammed inwardly and into the carton on the carton conveyor. Since the solenoid valve 238 is in series with the mechanical valve 244, it also must be energized to connect the vacuum cups 198 to the source of vacuum. The solenoid valve 238 is energized by the limit switches associated with the product feelers 96 thereby indicating that an erected carton should be made available for the product contained in the bucket.

Operation of the transfer mechanism 72 is as follows: Assuming that a carton has been deposited on the carton conveyor 38, as shown in FIG. 3, the vacuum must be released and this is accomplished when the roller 256 encounters the flat cam surface 166a. This occurs at the point indicated by the letter R. With the cam 166 rotating in the direction indicated by the arrow the roller 256 encounters and is urged by a shoe 260 toward the flat surface 166a of the cam. This causes downward movement of the rod 248 opening the valve 244 and at the same time the connecting rod 172 causes rotation of the bell crank 180 and the link 184 about the axis of the stub shaft 182. By virtue of the link 214 the bell crank 218 is rotated in a clockwise direction about the stub shaft 222 causing rotation of the sleeve 192 which, through the link 204, rotates the rocking lever 208 thereby extending the fingers 212 as shown in the upper portion of FIGURE 3. The product feeler 96 closes the limit switches associated therewith thereby opening the valve 238 thus connecting the vacuum cups 198 through the lines 236 and 200 with the vacuum pump 242. The pickup head is brought into engagement with the foremost carton in the magazine 70 and it firmly grips the carton removing it from the stack and rotates it downwardly and forwardly. The erecting fingers 212 are rotated, turning the carton wall they contact, and accordingly effecting erection of the carton to an extent that overbreak along the longitudinal score lines of the cartons is effected before the carton is deposited on the carton conveyor 38. The roller 256 again encounters and is urged by the shoe 260, toward the flat surface 166a of the plate cam 166 causing the rod 248 to move upwardly thereby disconnecting the line 236 from the source of vacuum. This causes release of the carton. It is to be understood, however, that the solenoid valve 238 is still conditioned to allow passage of vacuum therethrough since it will be recalled that the mechanical operative valve 244 and the solenoid valve 238 are in series. With the vacuum released the pickup and erecting head is again ready to repeat the cycle to transfer another carton from the magazine 70 to the carton conveyor 38.

In conditioning the transfer mechanism 72 to handle cartons of a lesser height it is necessary to turn the lead screw 158 to displace the magazine 70 to the right as viewed in FIG. 3. This lowers the reference score line RF to the desired elevation above the conveying reach of the carton conveyor 38. It is also necessary to lower the head 189 so that the position it assumes above the conveyor 38 at the instant the carton is released is equal to the height of the carton. Lowering of the head 189 is accomplished by loosening the bolts 186 and turning the crank 189 in a clockwise direction (as viewed in FIG. 3). This, of course, also provides proper registration of the head 189 with the stack of collapsed cartons in the magazine 70.

Further details of construction of the carton magazine 70 are shown in FIG. 4, 5 and 6. It is a feature of this invention to provide means, movable in the lateral guides 148, for ensuring that the cartons are fed one at a time by the transfer mechanism 72. To achieve this result the magazine 70 includes means for fanning the cartons before they are properly positioned for feeding thereby allowing a film of air to enter between the cartons. It also happens that during manufacturing of the carton those edges which are cut produce a multitude of small fibres entwined with the fibres of an adjacent carton. This, of course, results in loosely joining corresponding cut edges of the carton. As shown in FIG. 4 each of the lateral guides 148 have trolleys 262 rotatably mounting rollers 264 which are formed with generally V-shaped peripheral grooves for engaging respective guide bars 266 and 268, the upper and lower guide bars respectively. These guide bars are suitably secured to inwardly directed web portions 270 of the lateral guide 148. Each of the trolleys 262 carry an outwardly extending handle 272 disposed through a slot 274 in each of the guide rails 148. By grasping these handles the trolleys 262 may be moved rearwardly to position them to the rear of a stack of cartons. Each trolley has mounted thereon an elongate inwardly and forwardly extending carton fanning and pusher member 276 which is sufficiently flexible to flex the end cut flaps and thus ensure that the fibres of adjacent cartons are not entwined.

Associated with each trolley a spring 278, made by Hunter Spring, Division of Ametek Inc. of Hadfield, Penn., which is referred to as a power reel spring, is provided with a cable or cord 280 attached to a pin 282 carried by each trolley. As is evident by this construction each of the power reel springs 278 through the agency of the cable or cord 280 is effective to urge each of the trolleys forward, which in turn by virtue of the pusher members 276, moves the stack of cartons forward.

On the forward end of each of the lateral guides 148 there is provided a plate 284 having an inwardly directed portion 286 supporting a laterally adjustable carton restraining finger 288. Also, the lower web portion 270 of the lateral guides 148 are provided with carton restraining fingers 289 which cooperate with the fingers 288 to hold the forwardmost one of the collapsed cartons in a flat condition. Each plate has elongate slots 290 through which extend bolts 292 for securing the plates to the lateral guide 148. The plates may therefore be adjusted in the slots 290 depending on the size of the cartons so that the fingers 288 may assist in holding the carton in a flat condition. As shown the fingers 288 are carried by a short shaft 294 supported in blocks 296 secured to the upper surface of the inwardly directed portion 286. Any suitable means may be provided, such as a setscrew, in the blocks 296 for holding the fingers 288 in a desired adjusted position.

When it is necessary to restock the carton magazine a stack of cartons is located between the lateral guides 148 and pushed toward the discharge end against the rearwardmost carton which is already in the magazine. This will cause the carton fanning and pusher members 276 to be deflected outwardly. With one of the operator's hands pushing the carton forwardly the trolleys 262 are moved rearwardly by grasping the handle 272. This will cause the member 276 to fan the cut edges of the carton until it is moved a sufficient distance rearwardly so that it will again be free to assume the position shown in FIG. 4. The same operation is repeated with the other trolley.

This action will ensure that enough air enters between the stack cartons and that the cut edges of the carton are not joined in any way thereby ensuring proper removal of a single carton at a time by the transfer mechanism 72.

CARTON CONVEYOR

There is shown in FIGS. 7A and 7B a sectional side elevation of the carton conveyor 38 taken substantially along the line 7—7 of FIG. 1. The carton conveyor chains 123a, 123b, and 123c engage a plurality of idler sprockets 298 each of which is fixed to lateral stub shafts 300. The stub shafts 300 are in turn fixed to the frame members 42, 44 and 46. On the shaft 300 associated with the frame member 46, there is also mounted a sprocket 302 driving a sprocket chain 304 trained about another sprocket 306 which is keyed to a shaft 308 driving the trailing flap closing mechanism 74. Through a small right angle gear box 310, a shaft carrying a sprocket 312 drives a sprocket chain 314 which in turn drives another sprocket 316. Each of the sprockets 312 and 316 mount a radially extending arm 318 having secured thereto an upwardly extending crank pin 320. A connecting link 322 is bored to receive the crank pins 320 and it has attached thereto a bar 324 on the end of which is mounted a tucking finger 326. During operation of the conveyor the sprockets 312 and 316 are rotated in the same direction causing the connecting link 322 to describe a circular orbit by virtue of its connection to the crank pins 320. This occurs in timed relation with the movement of the carton on the conveyor so that each of the trailing flaps on one end of the carton is folded inwardly as the carton passes thereby.

In FIG. 7B which shows the downstream end of the carton conveyor, one of the carton flap heating mechanisms generally indicated by the numeral 328 is shown. This mechanism comprises a tubular body 330 attached to a suitably formed yoke 332 which is keyed to a shaft 334. A suitable electrical heater (not shown) is carried interiorly of the body 330 and it is connected to a source of electrical energy by means of conductors 336 located in the conduit 338. Air is supplied from the discharge of a suitable blower (not shown) to a conduit 340 and it is directed to pass, in heat transfer relation, over the heater before being discharged to a tube 342 on the end of which is attached a hot air distributing nozzle or baffle 344. As will be made evident in the description of FIG. 10 this baffle is formed so that the carton flaps desired to be heated pass over it, thus rendering the pre-applied adhesive tacky. The laterally spaced chill bars 78 are located immediately downstream from the heaters and are mounted on the plates 42 and 46 by upwardly extending brackets 346.

In order to prevent overheating and possibly burning of the carton in the event the cartoning machine is stopped for any reason, means are provided, whose specific mode of operation will be explained in connection with the over-all control system of the machine, for retracting the carton flap heating mechanisms. Such means are shown in FIG. 8 and are indicated by the numeral 348. From any suitable source compressed air is supplied to a conduit 350 which is connected to a solenoid valve 352 and to a conventional spring return air operated actuator 354. On the outwardly extending rod 356 of the actuator there is mounted a clevis 358 having a lever 360 pinned thereto at 362. The lever is also fixed to the shaft 334. With this construction it can be seen that when the valve 352 is opened allowing pressure fluid from the conduit 350 to enter the actuator 354 the rod 356 is extended (which is the position shown) rotating the shaft 334 in a counterclockwise direction. This positions the carton heating mechanism 328 so that the air distributing baffles 344 are effective to direct heated air to the adhesive on the carton flaps. The extent to which the carton heating mechanism 328 can be rotated is determined by a stop bolt 364 mounted on a small bracket 366 which is carried by the plate 40. Also on this bracket there is provided a limit switch LS7 which is actuated by an abutment 368 mounted on the link or lever 360.

The limit switch LS7 must be closed before the carton conveyor can circulate, thus ensuring proper positioning of the flap heating mechanism. This, of course, obviates the possibility of unsealed cartons being passed through the machine.

The chill bars 78 shown in FIG. 8 are formed with fluid passages 370 for circulating the cooling fluid passing through the conduits 372 and 374. On the mounting brackets 346 there are carried elongate guide bars 376 that ensure or prevent riding up of the cartons as they pass by the carton flap heaters 344 and the chill bars 78. The particular manner in which these bars are mounted is shown in FIG. 9 where it will be seen that inwardly extending arms 378 are rigidly secured to the brackets 346. The arms 378 are bored to receive a small rod 380 which is held in place relative to the arms 378 by set screws 382. By this arrangement the guide bars 376 can be properly adjusted to allow the cartons to pass freely through the chill bars and yet prevent upward movement of the cartons.

In FIG. 10 there is shown a transverse section of the carton conveyor and a carton as it passes by the air distributing baffle 344. The closure flaps 384a and 384b of the carton encounter stationary plows 386 having an incline surface 388 for camming the flaps 384a and 384b inwardly in order to position the lower free end of this flap which has the adhesive applied thereto against the baffles 344. By establishing such a position to the flap the adhesive is quickly heated and rendered tacky by the hot air issuing from the air distributing baffle 344. As the carton continues its progress to the discharge end of the conveyor and before it enters the chill bars the flaps 384a and 384b encounter seal compression blocks 390 which firmly press the heated strip of adhesive against the adjacent flap of the carton. Thereafter, the cartons pass through the chill bars 78 where the adhesive is quickly hardened.

In FIG. 11, a diagrammatic representation of the cooling system for the chill bars is shown. This system is provided with a pump 392 for moving the cooling fluid through the cooler 80 and through a conduit 394 which is connected to the passageways 370 of one chill bar, through the conduit 374 which passes the cooling fluid through the passageways 370 in the other chill bar. Fluid is returned to the pump by the conduit 372.

As was mentioned previously, the carton conveyor 38 is provided with mechanisms, driven by the sprockets 66 and 68 which are interconnected by the sprocket chain 64, for adjusting the relative lateral position of the sprocket-chain carrying plates 44 and 46 relative to the inner side frame 42 such that the lugs 44a are located equidistant from the lugs 42a and 46a. This adjustment is made to correspond with the length of the carton being filled. The constructional details of this mechanism are shown in FIGS. 12 and 13 and it is generally indicated by the numeral 396. It is to be understood, and is indicated in FIG. 1, that two of these adjustments are provided on the carton conveyor.

The lateral guide bars 54 and 56 have respective ends thereof suitably secured to the outer side frame 40 by bolts 398 and the remaining ends carried by the inner side frame 42 by providing threaded end portions on which are disposed nuts 400. Slidably mounted on the guide bar 56 is a bearing housing 402 having a flange 404 rigidly attached to the plate 44. This housing is formed with outwardly extending spaced lugs 406 which are slotted to freely receive a nut 408 threadedly disposed on the rod 62. The nut 408 is formed with a radially enlarged knurled head portion 410 which is located between the lugs 406. A generally rectangular clamp 412 (another view of which is shown in FIG. 3) is secured to the nut 408, and is in close proximity to a flat surface 409, which prevents rotation of the nut relative to the bearing housing 402 when the rod is rotated. The housing 402 is disposed through a clearance opening 413 formed in the plate 46.

On the transverse guide bar 54 there is also mounted a bearing housing 402a, of the identical constructions as the housing 402. This housing is attached to the sprocket chain carrying plate 46. Identical numerals, followed by the letter *a* are used to identify the part associated therewith.

The threaded rod 62 has two threaded sections 414 and 416 formed thereon and an intermediate nonthreaded portion 418. The lead of the screw portion 414 is twice that of the portion 416. The nut 408, shown in FIG. 13, is associated with the housing 402, and as will be observed, it is threaded on the screw portion 416 having the shorter lead.

In describing the operation of the carton length adjusting mechanisms it will be assumed that the machine is to be adjusted to handle a carton of greater length. A calibrated scale 420, together with an indicator 422 carried on the bearing housing 402a, is provided for indicating the adjustment of the carton conveyor. In adjusting the conveyor the crank 63 carried by the threaded rod 60 (FIGS. 1 and 2) is turned in a clockwise direction as viewed in FIG. 2. Such rotation is transferred to the screw 62 by the sprocket chains 64 which by virtue of the sprocket 68, fixed to the screw 62, rotates the screw in a direction translating the plate 46 and the plate 44 toward the outer side frame 40. Assuming that the degree of movement of the plate 46 relative to the plate 42 is two inches, the plate 44 will move in the same direction one inch. Thus, the lugs 44a carried by the chain 123b will still be positioned between the lugs 42a and 46a. Thus, it is readily apparent that the above-described feature of the present invention provides a very simple and effective means for conditioning the carton conveyor 38 to handle cartons of various lengths.

Also, associated with the carton conveyor are means for changing the longitudinal spacing between the pusher lugs 42a and 46a and the leading retaining lugs 44a. Such an adjustment is made to space the lugs in accordance with the width of the carton. Still referring to FIG. 12, it will be seen that the sprocket chains 123a, 123b and 123c are trained, respectively, about sprockets 127a, 127b and 127c. Such means for changing the longitudinal spacing of the lugs is shown in greater detail in FIG. 14, and it is generally designated by the numeral 422. Between the outer side frame member 40 and the inner side frame 42 is an elongate tubular shaft 129. The right hand end of this shaft, as viewed in FIG. 14, is located within a short tubular extension 424 of a housing 425 of a novel clutch mechanism 426. A bearing 428, located in a flange mount 430, rotatably receives the tubular extension 424. A nut 432 is threaded on the tubular extension 424 and it is tightened against a spacer collar 434. A small snap ring 436 is carried on the end of the shaft 129. The other end of the shaft has a hand wheel 438 fixed thereon by a key 440. Another bearing 442, in a similar flange mount 444, rotatably supports this end of the shaft to the frame 40. By means of bolts 445 the sprocket 127c is secured to a hub 446 which includes a tubular extension 448 slidably fitted on the shaft 129. A retaining ring 450 and a flange 451, between which is located the plate 44, prevent lateral movement of the hub 446 relative to the plate 44. The hub is formed with a counterbore 452 providing clearance for an elongate key 454 which is seated in the tubular shaft 129. The intermediate sprocket 127b is mounted on a hub 456 by bolts 458. This hub, however, is slotted to receive the key 454 and it is therefore prevented from rotation relative to the shaft 129. The hub 456 is held against lateral movement relative to the plate 46 in substantially the same manner as the hub 446 since a retaining ring 460 and a flange 461 are located on either side of the plate 46.

The remaining sprocket 127a is fixed by means of bolts 462 to the housing 425 of the clutch mechanism 426. This clutch comprises a circumferential wall 464 mounting a cover plate 466. As shown best in FIG. 15 a plurality of shoes 468, preferably three in number, supported on pins 470 are engageable with the inner surface of the circumferential wall 464. The pins 470 extend through clearance holes formed in a hub 472 and through aligned clearance holes in the wall of the tubular shaft 129. These pins are of sufficient length to extend a short distance into the center of the shaft 129 and are slightly rounded at 473.

The hub 472 is slotted to receive the key 454 therefore holding it against rotation relative to the shaft 129.

In the center of the shaft 129 an elongate rod 474, provided with a tapered portion 476, is freely slidably mounted. The left hand end of the shaft 129, as viewed in FIG. 14, is formed with a threaded counterbore 478 threadedly receiving an adjusting screw 480 rigidily connected to a reduced portion 482 of the rod 474. The adjusting screw is provided with a radially enlarged portion 484 and it is drawn up tight against a shoulder 488 on the rod 474 by a nut 486 threadedly connected on a threaded portion of the portion 482. Threadedly disposed on the adjusting screw 480 is a lock nut 490 which functions to hold the rod 474 in a selected axially adjusted position. It will be noted by inspection of FIG. 14, that the pins 470 engage the tapered surface 476 and it is evident that when the tapered portion 476 is moved axially relative to the pins 470 the shoes are in turn permitted to move radially inwardly or outwardly depending upon the direction in which the rod 474 is displaced. To establish driving relation between the hub 472 and the clutch housing 425 which carries the sprocket 127a, the rod 474 is moved to the left a sufficient distance to forceably engage the shoes 468 with the circumferential wall 464. The lock ring 490 is then brought up tight against the end of the tubular shaft 129. This will hold the rod 474 in place and rotation of the shaft 129 will be transmitted to the sprocket 127a through the pins 470 and the shoes 468. It is to be recalled that the driving sprockets for the chains 123a and 123c are at the discharge end of the carton conveyor and have been designated as 124a, 124b, 124c and 124.

In describing the operation of the means 422 for changing the longitudinal spacing of the lugs, it will be assumed that it is desired to handle cartons having a greater width. It is to be kept in mind that the shaft 122 (see FIG. 29) supports three sprockets 124a, 124b and 124c, about which are trained the lug carrying sprocket chains 123a, 123b and 123c. The sprocket 124b is freely mounted on the shaft 122 whereas the sprockets 124a and 124b rotate with this shaft. After the lock ring 490 has been loosened the adjusting screw 480 is turned moving the rod 474 to the right. This brings the clutch shoes 468 out of contact with the inner surface of the circumferential wall 464. The hand wheel 438, which is keyed to the shaft 129, is rotated in the appropriate direction rotating the sprocket 127b and accordingly the chain 123b thereby displacing the lugs 44a carried by this chain longitudinally relative to the lugs 42a and 46a. Since the sprocket 124b at the discharge end of the carton conveyor is free to rotate on the shaft 122 none of this motion is transferred to the sprockets 124a and 124c. Once the desired spacing between the center lug 44a and the lugs 42a and 46a is achieved, the adjusting screw 480 is again turned moving the rod 474 to the left, as viewed in FIG. 14, thereby engaging the tapered portion 476 with the inner ends of the pins 470 moving them radially outwardly. This engages the shoes 468 with the inner surface of the circumferential wall 464. After the screw 480 has been tightened it is locked in position by running the nut 490 against the end of the shaft 129. Thus, according to this feature of the present invention, it can be appreciated that the carton conveyor can be readily adjusted to firmly hold cartons of various widths by means which are easily accessible to the operator and which do not require additional removal of any parts to effect such a change.

THE PRODUCT CONVEYOR

Referring now to FIGS. 16 and 29 which show, respectively, a longitudinal section of the product conveyor and a diagrammatic perspective of the drive train, it will be observed that the transverse shaft 102 has fixedly mounted thereon the drive sprockets 86 about which are trained sprocket chains 84 also trained about the idler sprockets 85. The frame of the product conveyor is made of two laterally spaced plates 492 and 494 interconnected by longitudinally spaced generally rectangular braces 496 providing upper and lower transverse supporting surfaces 498 which support trackways 500 and 502 in which may be selectively disposed a follower roller 504 (see FIG. 21) which is connected to the pusher 94. Spaced vertically upwardly and overlying the trackway 500 is a trackway 506 carried on the underside of a plate 508 which is secured to the side plate 492 by brackets 510. As shown in FIG. 19, the trackway 506 has a branch 506a including an angularly directed portion 506b.

At the junction of the portion 506b and the main trackway 506 there is provided a solenoid operated switch assembly 512 mounted on the plate 508. This switch assembly is electrically correlated with the carton feeler limit switch LS4 such that in the event a carton is not available to receive the product in one of the buckets 90 the solenoid is actuated allowing the bucket to continue along the track 506 and thus prevent the contents of the bucket from being discharged therefrom since no carton is available for receiving the product. In the normal course of events, however, a carton is available and the switch assembly 512 is effective to direct the track follower roller 514 to traverse the track sections 506b and 506a, thus translating the buckets toward the cartons. The bucket is retracted to its original position when the follower roller 514 encounters an incline track section 506c against positioning the follower roller 514 in the trackway 506.

The roller 504 for operating the pusher 94 may be located to travel in the trackway 500 or 502. These tracks are mounted on a plate 516 which in turn is secured to the supports 498 which are the upper traverse ribs of the rectangular brackets 496. The spacial relationship of the pusher tracks 500 and 502 relative to the bucket tracks 506 is best shown in FIGS. 16 and 21. The conveyor chains 84 move the buckets in the direction of the arrows in FIG. 19 and each bucket must be shifted toward the plate 494, indicated by the arrow S in FIG. 19, before the roller 504 of the pusher 94 comes under the influence of either one of camming tracks 518 or 520. The reason for providing two tracks is for the purpose of changing the degree to which the pusher 94 must travel before the contents of the bucket are discharged into the carton. It oftentimes happens that the full stroke, which is approximately twelve inches, of the pusher is not required since the amount of product being inserted into the carton only requires the stroke of the pusher to be eight inches. In this event, the pusher roller 504 is guided to travel in the track 502 which restricts the stroke of the pusher to eight inches. As the buckets travel toward the switch assembly 512 the roller 514 is guided into the track portion 506b moving the bucket in the direction of the arrow S and the pusher roller 504 comes in contact with the track 520. Translation of the bucket in the indicated direction stops when the roller 514 is in the track section 506a. The pusher roller, however, continues moving the pusher 94 until the terminal point 522 of the track 520 is reached. As will be explained in connection with FIG. 20, means are provided on the return run of the product conveyor for engaging the pusher roller 504 and returning it so that it again is located within the tracks 500 or 502.

The constructional details of the solenoid operated switch assembly are shown in FIGS. 17 and 18. On the plate 508 there is rigidly mounted an upstanding support plate 524 carrying a solenoid 526 having its armature secured to an operating member 528 which is pivotally connected at 530 to a lever 532 pivotally mounted on the support plate 524 by a pin 534. The downward end of the lever 532 carries a small roller 536 slidably disposed in a slot 538 formed in an extension 540 of a switch plate 542. This switch is pivotally mounted on a pin 544 located in lugs 546 which are rigidly connected to the plate 508. As shown in FIG. 18, the switch plate 542 overlies the intersection of the trackways 506 and 506b and it has a downwardly projecting arcuate wall 548 which is engageable by the rollers 514. When the switch is in the full line position as shown in FIGURE 17, each of the bucket translating rollers 514 engage the wall 548 directing the roller to the track portion 506b. However, when the switch plate is raised, as shown in phantom outline, the rollers 514 continue in the track 506 and as a consequence translation of the buckets in the direction of the arrow S (FIG. 19) does not take place.

Associated with the operating member 528 is a spring return mechanism 550 carried by a bracket 552 which is part of the solenoid housing. The bracket 552 has a clearance hole for a threaded rod 554 on which are threadedly disposed longitudinally spaced nuts 556. Between the bracket 552 and one of these nuts a compression spring 558 is disposed in surrounding relationship to the rod 554. One end of this rod is in abutting contact with a bent portion 560 of the operating lever 528. When the solenoid 526 is energized the operating member pushes the rod 554 compressing the spring 558 and rotating the lever 532 to the position shown in phantom outline in FIG. 17. By virtue of a small roller located in the slot 538 the switch plate 542 is pivoted upwardly about the pin 544 to the approximate position also shown in phantom outline in FIG. 17.

As will be made plain in a description of the circuit diagram shown in FIG. 30, the solenoid 526 is energized allowing one or more buckets to continue down the track 506 when there is no carton available for the product. Upon deenergization of the solenoid the spring 558 positions the lever 532 and the switch plate 542 to the full outline position shown in FIG. 17. It can therefore be seen that the product conveyor of the present invention provides a simple and effective mechanism, responsive to the absence of a carton on the carton conveyor, which will prevent discharge of the product from the bucket.

By virtue of the tracks 500 and 502, in either one of which the pusher actuating roller 504 may ride, the stroke of the pusher may be the full length of the bucket (approximately twelve inches) or a portion of its length. The means for determining the stroke of the pusher is shown in FIGS. 19, 20 and 21. Referring first to FIG. 19, it is to be noted that the camming track 518 is made of two sections pivotally interconnected at 562 with one section being indicated as 518a and the other as 518b. The latter referred to section is pivotally movable about the axis of the pivot connection 562 to the phantom line position shown in FIG. 19. Such pivotal movement is accomplished by providing an operating lever 564 extending through an elongate slot 566 in the frame plate 492. As shown best in FIG. 21, an intermediate portion of the handle 564 is connected to a shaft 568 rotatably disposed in housing 569 depending from the plate 516. The upper end of the shaft is formed with a square section which is fitted in a complementary square hole provided in the track section 518b. The operating handle 564 includes a portion 570 at the end of which there is mounted a pin 572 to which is pivotally connected an elongate switch operating rod 574. The other end of this rod is pivotally connected at 576 to a link 578 which is rigidly attached to a generally U-shaped switch 580. The switch is positioned to engage, and allow to freely pass therethrough, the pusher operating rollers 504. Depending upon the adjusted position of the switch 580 the pusher 94 is conditioned to either provide a stroke of eight or twelve inches.

In FIG. 20, which is a partial longitudinal section of FIG. 16 substantially along the line 20—20, there is shown the arrangement of the lower return run of the product conveyor. Mounted on a plate 582, which is rigidly attached to the lower surface of the support surfaces 498, are a pair of converging rails 584 and 586 defining a passageway 588 through which the pusher operating roller 504 may pass. At the exit of this passageway the switch 580 is properly positioned to engage the roller 504 and direct it to the track 500, which conditions the pusher for a full stroke of twelve inches, or the track 502 for an eight inch stroke. It is to be kept in mind that the operating handle 564 is effective to reposition the track portion 518b from its full line to its dotted line position shown in FIG. 19 and at the same time, by virtue of the rod 574, position the switch 580 on the lower run of the product conveyor.

Let it be assumed that the product conveyor is conditioned so that the pusher is to take a full twelve inch stroke. To do so, the operating handle 564 is adjusted to the position shown in FIG. 19 wherein the track portion 518b directs the roller 504 to contact the camming track 518. As a bucket approaches the switch assembly 512, the bucket roller 514 is directed to the angularly disposed track section 506b thereby moving the bucket in the direction of the arrow S. Continued movement of the bucket allows the pusher roller 504 to engage the track section 518b whereupon continued movement brings the roller 504 in rolling engagement with the track section 518a causing displacement of the pusher 94 until the end of the track, indicated by the numeral 522, is reached. The product pusher therefore has reached its maximum displacement and it stays in this position until the roller 504 reaches the rail 586 on the lower return run of the bucket conveyor. Since the roller has been displaced forwardly it engages the rail 586 (FIG. 20) causing retraction of the pusher as the bucket advances. Such retraction continues until the roller 504 again engages the trackway 500.

When it is desired to set the product pushers for an eight inch stroke the operating handle 564 is moved in the slot 566 to assume the phantom outline position shown in FIG. 19 and indicated by the numeral 564a. As a result, the track portion 518b assumes the phantom outline position shown in FIG. 19 and the switch 580, by virtue of its connection with the operating rod 574, assumes the position shown in phantom outline in FIG. 20 and identified as 508a. As the buckets traverse the return run of the conveyor the pusher operating roller 504 is constrained to enter the track 502. It is to be kept in mind, however, that the bucket translating roller 514 is always returned to the track 506 regardless of whether the pusher roller 504 is adjusted for the short stroke or long stroke. As the bucket moves toward the switch assembly 512 with the pusher roller 504 now guided by the track 502 the bucket roller 514 is directed to the track section 506b moving the bucket in the direction of the arrow S. Such translation also moves the pusher roller 504 in the same direction, since it has left the track 502 at this point and the pusher roller comes in contact with the track 520 whereupon the pusher 94 travels toward the carton conveyor until the end point of this rail is reached.

In addition to providing a product pusher having the ability to produce a stroke of twelve or eight inches (these values being merely exemplary since it would only require repositioning of the tracks to give a desired stroke length) the tracks 518 and 520 are arranged to impart a gentle and controlled motion to the pusher member 94. To achieve this result the bucket translating trackways 506a and 506b and the pusher tracks 518 and 520 cooperate to translate the product in such a manner that no acceleration or inertial loads of sufficient magnitude are imparted that would disturb product orientation in the bucket thus clearly avoiding damage to the product.

FIG. 19A, which is an enlarged fragmentary of FIG. 19, shows the manner in which controlled motion of the product pusher roller 504 is achieved. The path followed by the bucket translating roller 514 before, during and at the completion of its inward movement is indicated by the phantom line B.R. In like manner the path of the pusher roller 504 up to the time it encounters the track section 518a is indicated by another phantom line designated as P.R. Let it be assumed that the product pusher is conditioned to take a twelve inch stroke. The track section 518b is therefore located in the full outline position directing the rollers 504 to contact the camming track 518. When the bucket roller 514 encounters the curved wall 548 of the switch plate 542 the bucket is controllably and gradually displaced assuming a constant velocity of displacement when the straight portion of the path B.R. is traversed. Constant velocity of bucket movement is maintained until such time as the bucket track portion 506a is engaged by the roller 514. Before the portion 506a is engaged by the roller 514 the pusher roller 504 makes contact, approximately at the point R, with the inclined surface 519 of the track section 518b. At this point there commences to be imparted to the product pusher 94 a low value of acceleration relative to the bucket with such acceleration continuing until the point S is reached by the roller 504. The roller 504 then rides along the track portion 518a which causes the pusher 94 to move toward the discharge end of the bucket at a constant velocity.

The same motion characteristics are obtained when the pusher is conditioned to provide an eight inch stroke. Still referring to FIG. 19A it will be seen that the path P.R. of the pusher roller 504 for an eight inch stroke engages the track 520 at the point R' located on a surface portion 520a which is inclined relative to the surface 520b. From the point R' to the point S', the juncture of the surfaces 520a and 520b, the pusher 94 roller is gently accelerated relative to the bucket motion thus reducing to a minimum inertial forces which may tend to disturb the orientation of its product. When the roller 504 rides along the track surface 520b the pusher 94 is moved toward the cartons at a constant velocity.

It can now be appreciated, in view of the above, that the product conveyor of this invention is easily conditioned to provide a long or short stroke for the pusher member 94 with the length of such stroke being dictated by the quantity of product carried by the bucket. This, of course, eliminates useless travel and consequent wear of the pusher mechanism. In addition a shorter stroke reduces the degree of sliding friction to which the pouch is subjected.

PRODUCT BUCKETS

In accordance with another novel aspect of the present invention a unique product bucket and arrangement for attaching the bucket to the product conveyor is provided. Attached at regularly spaced intervals, between and to the conveyor chains 84, are parallel rods 590 on which are slidably mounted cross heads 592 provided with flanged bushings 594 slidably fitted on the rods 590. The cross heads are maintained in longitudinally spaced relationship (FIG. 23) by being rigidly secured to elongate guide bars 596 by screws 598. The guide bars are spaced and parallel to each other to define a slot in which is slidably mounted a carrier 600 provided with slots for receiving ribs 602 formed on the guide bars 596. To the lower surface of the carrier 600 there is rigidly secured a block 604 rotatably supporting the pusher cam follower roller 504. Overlying the guide bars 596 and the carrier 600, is a generally rectangular platform 606 whose upper surface is dimpled, preferably in a raised diamond pattern. Fixed in any suitable manner to the under surface of the platform and even with the lateral edges thereof are small angle bars 608 having upwardly extending slots 610 (FIG. 23) for receiving a grooved portion of a mounting pin 612 formed with a circular head 614, a hexagonal spacer section 616 and a short threaded portion (not shown) threadedbly received in tapped holes formed in the guide bars 596. There are three of these mounting pins spaced longitudinally as shown in FIG. 22 for each of the angle bars 608. The platform 606 is provided with a longitudinal slot 618 in which is disposed a small tongue 620 being part of a bracket 622 to which is attached, by means of a bolt 624, a generally triangular plate 626 which is rigidly connected to the pusher 94. The bracket 622 may be connected to the carrier 600 in any suitable manner.

Referring now to FIGS. 22 and 23 it will be seen that on the right-hand end of the guide bars 596 an angle bracket 628 is secured by small screws 630. At regularly spaced intervals a plurality of spring clips 632, preferably four in number, are rigidly connected to the horizontal web of the angle 628 and are bent at 633 to provide a latching surface for holding the bucket 90 in place. It is to be noted that the bucket translating roller 514 is rigidly connected to the angle bracket 628.

The bucket illustrated in FIGS. 22–24 is approximately half the width of the widest bucket that can be supported on the platform 606. Regardless of the width of the bucket, one side wall is arranged to engage the mounting pins 612 to prevent shifting of the bucket. As shown in FIG. 23, the bucket comprises a pair of laterally spaced upstanding side walls 634 and 636 having the general outline indicated in FIG. 23. The rearward end of each wall has a tail portion 638 of reduced heighth and the ends are interconnected by a transverse brace 640 having an upwardly extending portion with a rounded end as indicated by the numeral 642. By virtue of the spring clips 632, which are in engagement with the rounded ends 642, the bucket is in part held in place. On the side wall 634 of the bucket, offset slots 644 are provided for receiving the grooved portion of the pins 612, and it will be seen by inspection of FIG. 23, that the slots 644 are directed such that when the bucket is set down on the platform 606 with the pins 612 engaged in a slot 644, a slight amount of rearward movement is permitted in order to engage the spring clips 632 over the rounded ends 642. The other side wall 636 is somewhat shorter than the wall 634 since it merely rests on the upper surface of the platform 606.

To assist and retain the walls in parallel relationship a spacer bar 646 threadedly receiving the screws 648 is provided. It is to be observed that the bottom wall of the bucket is defined by the platform 606. However, an extension of this wall is formed by a transverse lip 650 having its ends connected to the lower forward edges of the walls 634 and 636. As shown in FIG. 23 the lip extends a short distance beyond the forward vertical edges of the side walls of the bucket. As will be made clear in connection with the description of FIGURE 26B this lip 650 serves the function of a ramp while the product is being inserted into the carton.

Attached to respective portions of the side walls 634 and 636, forwardly extending slightly inwardly bent carton side wall engaging fingers 652 and 654 are provided. The forward ends of these fingers are substantially coplanar with the end of the lip 650. Thus when the bucket is moved toward and into the carton these fingers project into the carton to the same extent as the lip 650. When the bucket is in the carton the fingers 652 and 654, due to their slightly bent relationship, easily enter the open end of the carton and they engage the side walls of the carton constraining it to assume a properly erected position and hold it in this position until insertion of the product is complete.

The operational sequence of the buckets 90 before, during and after insertion of the product is shown in FIGS. 26A–26D. As shown in FIG. 25, the carton flaps on the loading end of the carton are designated as 384a, 385a, 387a and 389a. Suitably shaped and positioned means are provided, the details of which are shown in FIGS. 27A–27F for manipulating these flaps to produce a closed carton after the product has been inserted therein. Referring now to FIGURE 26A, which shows the relationship of the carton C and the product bucket 90 immediately before translation of the bucket, it will be seen that the upper flap 384a and the lower flap 387a are cammed upwardly and downwardly, respectively, by plows 656 and 658. The carton and the laterally adjacent bucket 90 are moving at the identical speed and are maintained in lateral alignment. Under such conditions when the bucket is shifted toward the open end of the carton, as shown in FIG. 26B, the transverse lip 650 enters the carton and overlies its bottom wall while the fingers 652 and 654 (only one of which appears in these figures) engage the opposite side walls of the carton. Immediately after the bucket has entered the carton the pusher 94 is actuated due to the engagement of the roller 504 with the camming track 518. Since the camming track 518 is used, a full stroke of twelve inches takes place. The product, shown in phantom and identified by the letter P, is inserted into the carton and completely contained therein when the pusher 94 has reached the end of its stroke. This is shown in FIG. 26C. When this operation is completed the bucket is translated to the right, as shown in FIG. 26D, while the pusher 94 remains in its forwardmost position until the lower return run of the product conveyor is passed wherein the rail 586 assists in returning the pusher to its rearmost position. In addition to the function performed by the fingers 652 and 654, the provision of the lip 650, which is an extension of the platform 606, provides a continuous rigid surface along which the product travels while it is being inserted into the carton. This aspect of the present invention is particularly valuable when flexible packages of web material are being inserted into the cartons. Thus packages of the mentioned type may be inserted into the carton without presenting the possibility of damaging the web of the soft pack.

Reference should be made now to FIGS. 27A–27F which show the various stationary and live plow mechanisms which are provided for closing the flaps of the carton. After an erected carton is positioned on the carton conveyor the flap 384a comes in contact with an inwardly extending portion of the stationary plow 656. Upon movement of the carton a short distance the flap 387a is cammed downwardly by a bent portion 660 directing this flap to underlie the plow 658. During this time the other end of the carton is passing by camming fingers 662 carried by a support bracket 664 which is mounted on the plate 46. These fingers spread the flaps 384b and 387b ensuring that they will not interfere with subsequent closing of the flaps 389b and 385b. Before leaving the fingers 662 the flap 389b is bent inwardly by another stationary plow 666 including leading angularly inwardly directed extensions 668 which are effective to fold the flap 389b inwardly as the carton passes thereby. As shown in FIG. 27C before the extensions 668 have an opportunity to engage the flap 385b the orbiting finger 326 actuated by the mechanism 74 turns this flap inwardly a sufficient distance so that when it does contact the extensions 668 it is in position to be engaged thereby and completely folded by the downstream portion of the plows 666. Further along the carton conveyor another set of stationary plows 670 are encountered which confine their action to the flaps 387b and 384b respectively. The flap 387b, which extends laterally outwardly before coming under the influence of the set of plows 670, is cammed upwardly and inwardly to overlie the flaps 389b and 385b by a plow 672 having a camming surface 672a locating this flap on the inner surface of a longitudinal fence 670a. The flap 384b is bent downwardly and inwardly a slender plow 674, locating this flap on the outer surface of the fence 670a.

The plow 674 has a rearward portion 674a fixed to an outwardly extending web 676. The portion 674a is spaced a sufficient distance outwardly from the fence 670a to define a small channel of sufficient width to allow the lower edge of the flap 384b to ride therein thus holding this flap in close adjacency with the outer surface of the fence 670a. The flap 384b is held in this position so that the air distributing nozzles 344 may be located closely adjacent to the inturned surface of the flap 384b. Reference to FIG. 10 will shown this relationship.

After the product has been inserted into the carton the flaps 389a and 385a are closed respectively. The lower stationary plow 658 terminates at a point where insertion of the product into the carton is completed. The upper stationary plow, however (FIG. 27E) still maintains the upper flap 384a bent upwardly. The flap 389a is cammed inwardly by the member 678 and the short traveling flap 385a is turned inwardly by the closing mechanism 76 (not shown in these operational drawings). Another plow arrangement 680, similar to the plows 670 turns, respectively, the flap 387a upwardly and inwardly, and turns the flap 384a downwardly and inwardly; however, these last mentioned flaps are separated by the vertical fence 682 and held this way until the nozzle 344 of the other heat gun may enter therebetween. As the carton passes over the nozzles 344, the flaps 384a and 384b are held against the nozzles by the herein before mentioned plow 386. Again, reference to FIGURE 10 will show this relationship.

FIG. 28 shows a perspective diagrammatic of the carton conveyor and the product conveyor. Typical packages P are shown to be deposited in the buckets 90 and in every position there is a properly erected carton on the carton conveyor 38. Shortly after the cartons are deposited on the conveyor the transversely aligned bucket 90 is shifted laterally entering the carton before the product pusher 94 starts to move toward the forward end of the bucket. Further on, the product pusher is actuated moving the packages into the carton. The product pusher stays at the forward end of its stroke while the bucket is moved to its rearwardmost postion in preparation for traversing the return run of the conveyor chains 84. The product is now properly encased in the carton and the flaps at the loading end of the carton are closed by the aforementioned plow arrangements. Prior to entering the chill bars 78 the adhesive which is applied to the closure flaps pass the heat guns rendering such adhesive soft and tacky. The flaps are then turned inwardly and are pressed in contact with the corresponding adjacent flaps by the chill bars 78 which, as explained above, harden the adhesive over a short distance of travel thereby resulting in a properly sealed carton.

It is one feature of this invention to maintain the loading end of the carton in a predetermined longitudinal plane which is indicated by the construction line LR in FIG. 28. Regardless of the length of the carton, the loading end is always maintained in this plane. It will be recalled that adjustment of the carton conveyor for cartons of different length does not involve adjustment of the inner frame 42.

It is also a feature of this invention to maintain the trailing vertical wall of the carton fixed with relation to a transverse reference plane indicated by the construction line TR in FIG. 28. This ensures proper alignment of the bucket wall 634 with the rearward vertical wall of the carton. It should also be recalled that when the carton conveyor is adjusted to handle cartons of a greater or lesser width, the lugs 44a are moved relative to the pushing lugs 42a and 46a. Consequently, registration of the buckets with the cartons is easily attained. This is in contrast with present practice wherein machines of this type are adjusted with reference to the imaginary longitudinal axis of the cartons.

Before describing the operation of the machine when it is set up for automatic operation reference is made to FIG. 12 showing several cams which are driven in timed relation with the drive of the carton and product conveyors. The gear box 170 contains two bevel gears 690 and 692 secured respectively to the shaft 114 and the shaft 168. The shaft 168 has a portion 168a extending outwardly from the frame member 40 and it has fixed thereon timing cams 694a, 694b, 694c and 694d. These cams are provided for actuating, respectively, limit switches LS2, LS3, LS5 and LS6. The particular function served by these limit switches will be explained in connection with the following description of the circuit diagram shown in FIGURE 30.

As shown in FIG. 30, power is supplied to the circuit by lines L1 and L2 to which are directly connected the blower motor in line 27 and the heaters 328 in lines 29 and 30. Also connected to the lines L1 and L2 is a suitable step-down transformer 700. Before the machine is conditioned for automatic operation the pushbutton PB5 in line 3 is depressed energizing the relays 2M and 5CR in lines of 3 and 4 respectively. Contacts 2M-3 in lines 4 and 2M-1 and 2M-2 in line 27 are closed in contacts 5CR-3 in line 10 and 5CR-1 and 5CR-2 in line 28 are also closed, energizing the blower motor M in line 27 and the heaters 328 in lines 29 and 30. Operation of these elements is necessary to ensure availability of heated air to the nozzles 344 before the conveyor 38 is operated. Pushbutton SS3 in line 6 is depressed actuating the refrigerating unit 80 and the pump 392 thereby supplying cooling fluid to the chill bars 78. In addition, it is necessary to operate the vacuum pump 242 which is connected to a motor 242a in line 7. This motor is energized by depressing the pushbutton SS1 in line 8.

With these preliminaries completed, pushbutton PB3 in line 10 is closed, energizing relay 1CR in that line, since the contacts 5CR-3 are now closed due to the energization of the relay 5CR in line 4. Also energized is a solenoid 352a associated with the valve 352. When the valve 352 opens, pressure fluid supplied by the line 350, is communicated to the actuator 354, rotating the heating mechanisms 328 to the position shown in FIG. 8. At this time, the limit switch LS7 is closed by the abutment 368, energizing time delay relay TR in line 12. This relay may be set to actuate the contacts TR-1 in line 13 from zero to twenty seconds. For the purpose of this description, let it be assumed that after a lapse of ten seconds, the contacts TR-1 in line 13 close, thus energizing relay 2CR in line 13. Normally open contacts 2CR-1 and 2CR-2 in lines 12 and 17, respectively, close while the normally closed contacts 2CR-3 and 2CR-4 in lines 17 and 18, respectively, open. The conveyor drive motor 98 in line 18 is connected to the line, while at the same time, the dynamic brake, which is part of an SCR adjustable speed drive, Model 400, manufactured by the Dodge Manufacturing Corporation of Mishawaka, Ind., is deenergized, starting the carton and product conveyors.

Product contained in the bucket 90, contacts the feelers 96 which are arranged to close limit switch LS1. Limit switch LS2 in line 19 operated by the cam 694a also closes energizing the relay 3CR in line 19. Contacts 3CR-1 and 3CR-2 in lines 20 and 21, respectively, are closed and the limit switch LS3 actuated by the cam 694b is also closed, thereby providing a holding circuit which maintains the relay 3CR energized. With contacts 3CR-2 in line 21 closed, a solenoid 238a for operating the valve 238 is energized opening this valve thereby supplying vacuum to the cups 198. In transferring a carton from the magazine 70 to the conveyor 38, the limit switch LS4 in line 22 is closed energizing a relay 4CR also in line 22. Normally open contacts 4CR-1 in line 23 close permitting the relay 4CR to remain energized since the limit switch LS4 opens immediately after it is closed. Since actuation of limit switch LS4 indicates that a carton is available for the product, the solenoid 526 in line 24 for the switch gate 542 remains deenergized since upon energization of the relay 4CR line 22, the normally closed contacts 4CR-2 in line 24 open thereby maintaining the switch gate 542 in its downward position in order to direct the rollers 514 to the track portion 506a thereby causing translation of the bucket into an available carton.

Should the machine be shut down for other than emergency reasons the time delay relay TR in line 12 will remain energized and accordingly, keep the contacts TR–1 in line 13 closed for a sufficient period of time to ensure sealing of a carton which may happen to be located at the heating nozzles 344 thus preventing the production of unsealed cartons.

In the event of an emergency the machine is shut down by opening a normally closed pushbutton PB6 in line 10 which deenergizes relays 1CR, 2CR, TR and solenoid 352a. This opens contacts 2CR–2 and colses 2CR–3 and 2CR–4 energizing the dynamic brake in line 16 thereby stopping the motor 98. To stop the hot air blower, relay 2M is deenergized by opening normally closed pushbutton PB4 in line 3 which opens contacts 2M–3, in line 4 and 2M–1 and 2M–2 in line 27. Relay 5CR is also deenergized opening contacts 5CR–1 and 5CR–2 in line 28 whereupon the heaters in lines 29 and 30 are disconnected from the lines L1 and L2.

Thus, according to the invention, it is to be appreciated that a cartoning machine has been provided which is quickly and easily adjusted to handle cartons of different styles and sizes. The machine is particularly adapted to insert pouch-packaged material in cartons since the product bucket partially enters the carton and therefore provides a rigid surface along which the pouches travel during insertion into the carton. In addition the size of the machine is materially reduced by providing chill bars which are effective to quickly harden the adhesive while being effective to press the closure flaps to ensure pressure contact with the underlying flaps. By providing a machine having its adjustments for carton length and width made relative to the mentioned transverse and longitudinal reference planes, problems of registration between the buckets and the carton are avoided.

Further the novel transfer mechanism 72 effects over break of the carton before it is deposited between the lugs of the carton conveyor thus ensuring a properly erected carton which facilitates entrance of the product bucket therein.

While a preferred form of the invention has been shown and described it is to be understood that the inventive concepts are susceptible to being embodied in modified forms. It is requested that the scope of the appended claims be limited to the extent dictated by the prior art.

What I claim is:

1. A cartoning machine comprising a carton magazine supporting a stack of heat sealable collapsed cartons, a carton conveyor, a transfer mechanism for removing cartons from said magazine and depositing them in an expanded condition on said carton conveyor, carton flap enclosing devices, one of said devices located to close the flaps on one end of the carton after said carton is deposited on said carton conveyor, a product conveyor located laterally adjacent said carton conveyor, product confining receptacles carried by said product conveyor, means associated with said product conveyor for translating said receptacles so that they partially enter the open end of the carton, a pusher element for each of said receptacles for moving the product from said receptacle into the carton, means for translating said pusher element to move the confined product from said receptacle into the carton, said receptacle and said pusher translating means including means for retracting said receptacle and said pusher to their original position, the other of said carton flap closing devices located to fold the flap at the remaining end of the carton, heat distributing nozzles for conditioning the carton for sealing, and means for cooling and pressing the end flaps to an underlying portion of the carton to effect sealing of the carton.

2. The invention according to claim 1 wherein said transfer mechanism comprises vacuum cups for grasping one panel of the carton, and erecting fingers for engaging an adjacent panel of the carton, means operative upon removal of the carton from said magazine for rotating said fingers relative to said vacuum cups to thereby break the carton along its longitudinal score lines whereupon an erected carton is deposited on said carton conveyor.

3. The invention according to claim 1 further comprising flexible carton pusher members slidably mounted in laterally spaced guide rails between which a stack of collapsed cartons are supported, said pusher members being disposed laterally inwardly to engage the rearwardmost carton of such stack and being of sufficient flexibility to be deflected laterally outwardly when a quantity of collapsed cartons are deposited in said magazine, said pusher members being effective to insure separation of the collapsed cartons by fanning the cartons when the pushers are again postiioned to engage the rearwardmost carton.

4. The invention according to claim 1 further comprising means for disabling said receptacle and said pusher translating means in the event a carton is not present on said conveyor to receive the product.

5. The invention according to claim 4 wherein said disabling means comprises a solenoid operated switch gate which is positioned to allow said receptacle to be orbited by said product conveyor without causing lateral translation thereof toward said carton conveyor.

6. The invention according to claim 1 wherein said product conveyor comprises camming tracks for translating said receptacles toward said carton conveyor, additional camming tracks for translating said pusher elements to effect discharge of product into the carton, said tracks being arranged such that translation of the bucket must be initiated before the pusher camming tracks are effective to translate said pusher elements.

7. The invention according to claim 1 further comprising means for conditioning said carton transfer mechanism to prevent removal of a carton from said magazine should a product receptacle be empty or contain less than the desired amount of product.

8. The invention according to claim 1 wherein said product receptacle comprises a rigid platform formed to provide a pattern of raised projections, said platform being transversely reciprocably mounted on said product conveyor, laterally spaced vertical side walls on said platform, a lip secured to the forward lower edges of said side walls and defining an extension of said platform.

9. The invention according to claim 1 wherein said pusher element translating means effects an initial controlled acceleration of the product, such acceleration being of a magnitude which keeps to a minimum the inertial forces experienced by the product to thereby maintain the product in a fixed position relative to said pusher element.

10. A cartoning machine comprising transversely spaced product and carton conveyors cooperably arranged to transfer products from said product conveyor to open cartons on said carton conyeyor while said conveyors are moving, said product conveyor comprising a plurality of receptacles for containing one or more items of product, each of said receptacles having a product discharging device which is movable with and relative to said receptacles in order to move product from said receptacles into a carton aligned therewith and having a ramp bridging the space between said product and carton conveyors, means for translating said receptacles until said ramp enters the carton to thereby provide a rigid product supporting surface which defines an extension of the lower horizontal wall of the carton, and means for translating said product discharging device for transferring the product from said receptacle into the carton, said last mentioned means being actuated before translation of said receptacle is terminated in order to maintain the value of momentum of the product until the product is inserted in the carton.

11. The apparatus according to claim 10 further comprising means on said product conveyor for controlling the stroke of said product discharging device.

12. The apparatus according to claim 10 wherein said receptacle includes extensions engaging the side walls of the carton during transfer of the product into the carton.

13. A cartoning machine comprising product and carton conveyors cooperably arranged to transfer products from said product conveyor to open cartons on said carton conveyor while said conveyors are moving, said product conveyor comprising a plurality of receptacles for containing one or more items of product, each of said receptacles having a product discharge device which is movable with and relative to said receptacles in order to move product from said receptacles into a carton aligned therewith, means for translating said receptacle to partially enter the carton and thereby provide a rigid product supporting surface which defines an extension of the lower horizontal wall of the carton, means for translating said product discharging device for transferring the product from said receptacle into the carton, said last mentioned means being actuated before translation of said receptacle is terminated in order to maintain its value of momentum substantially constant until the product is inserted in the carton, and means on said product conveyor for controlling the stroke of said product discharge device, said stroke controlling means comprises spaced trackways, a roller on said product discharging device, said roller slidably movable in either of said trackways, and a selectively operable switch for directing said roller to one or the other of said trackways.

14. A method of cartoning one or more packages contained in a receptacle which is reciprocated to partially enter an open carton and which is provided with a device for discharging the packages from the receptacle into the carton, said packages being made of thin filmy web material that is subject to distortion by displacement of its contents in the event of abrupt changes in momentum and the displacement of the packages relative to each other in said receptacles due to such changes in momentum, said method comprising the steps of initiating and continuing translation of the receptacle to impart a given value of momentum to the package or packages contained in the receptacle, arresting translation of the receptacle after it partially enters the carton, and maintaining the value of momentum of the package or packages until they are discharged into the carton by the force supplied by the discharging device.

References Cited

UNITED STATES PATENTS

| | | | |
|---|---|---|---|
| 2,644,625 | 7/1953 | Currivan | 53—252 |
| 2,662,355 | 12/1953 | Ross | 53—186 |
| 3,156,167 | 11/1964 | Galloway | 53—186 X |
| 3,269,091 | 8/1966 | Martin | 53—252 |
| 3,298,288 | 1/1967 | Anderson et al. | 93—53 |
| 3,298,289 | 1/1967 | Szabo | 93—53 |
| 3,300,946 | 1/1967 | Martin | 53—73 |
| 3,306,004 | 2/1967 | Galloway | 53—284 |

THERON E. CONDON, Primary Examiner

R. L. SPRUILL, Assistant Examiner

U.S. Cl. X.R.

53—63, 73, 186, 252, 284, 375

FO-1050
(5/69)

UNITED STATES PATENT OFFICE
CERTIFICATE OF CORRECTION

Patent No. 3,509,681            Dated May 5, 1970

Inventor(s) Frank J. Sass

It is certified that error appears in the above-identified patent and that said Letters Patent are hereby corrected as shown below:

Column 3, line 65, change "Fig." to -- Figs. --. Column 4, line 20, change "gars" to -- bars --. Column 8, line 11, change "Fig." to -- Figs. --. Column 11, line 3, after "rod" insert -- 62 --. Column 12, line 31, after "shoes" insert -- 468 --. Column 13, line 41, change "against" to -- again --. Column 15, line 52, change "508a" to -- 580a --. Column 19, line 10, change "shown" to -- show --.

Signed and sealed this 17th day of August 1971.

(SEAL)
Attest:

EDWARD M. FLETCHER, JR.
Attesting Officer

WILLIAM E. SCHUYLER, JR.
Commissioner of Patents